United States Patent
Mobini

(10) Patent No.: US 10,489,778 B2
(45) Date of Patent: Nov. 26, 2019

(54) SECURE PAYMENT CARD

(71) Applicant: Zanguli LLC, Boca Raton, FL (US)

(72) Inventor: Behrooz Mobini, Rockville, MD (US)

(73) Assignee: ZANGULI LLC, Boca Raton, FL (US)

( * ) Notice: Subject to any disclaimer, the term of this patent is extended or adjusted under 35 U.S.C. 154(b) by 1030 days.

(21) Appl. No.: 14/291,387

(22) Filed: May 30, 2014

(65) Prior Publication Data

US 2015/0149365 A1    May 28, 2015

Related U.S. Application Data

(60) Provisional application No. 61/908,127, filed on Nov. 24, 2013.

(51) Int. Cl.
  *G06Q 20/38*   (2012.01)
  *G06Q 20/20*   (2012.01)
  *G06Q 20/02*   (2012.01)

(52) U.S. Cl.
  CPC .......... *G06Q 20/382* (2013.01); *G06Q 20/02* (2013.01); *G06Q 20/20* (2013.01)

(58) Field of Classification Search
  CPC .............. G06Q 20/3278; G06Q 20/325; G06Q 30/0255; G06Q 20/351; G06Q 20/3823;
  (Continued)

(56) References Cited

U.S. PATENT DOCUMENTS 5,970,479 A * 10/1999 Shepherd ............... G06Q 40/02
                                                  705/37
8,478,196 B1   7/2013 Hewinson
(Continued)

FOREIGN PATENT DOCUMENTS

WO    1996024913 A2    9/1996

OTHER PUBLICATIONS

Ion, I. et al., "Don't Trust POS Terminals! Verify In-Shop Payments with Your Phone," [online] In Workshop on Security and Privacy Issues in Mobile Phone User 'SMPU 8' [retrieved Jan. 2, 2014] retrieved from the Internet: <http://www.vs.inf.ethz.ch/events/spmu08/docs/fp01-ion_dragovic-READY.pdf>, 10 pg.
(Continued)

*Primary Examiner* — Johann Y Choo
(74) *Attorney, Agent, or Firm* — Cuenot, Forsythe & Kim, LLC

(57) ABSTRACT

A payment card includes interface circuitry and a processor coupled to the interface circuitry. The processor initiates operations using the interface circuitry as part of a transaction. The operations include receiving a certificate from a merchant system, encrypting the certificate, and sending the encrypted certificate to the merchant system with an instruction to forward the encrypted certificate to an authorization system for the payment card. An encrypted response is received. The encrypted response originates from the authorization system and is forwarded to the payment card by the merchant system. The merchant system is unable to decrypt the encrypted certificate and the encrypted response. The payment card decrypts the encrypted response and determines whether authentication of the merchant system is successful according to the response.

66 Claims, 9 Drawing Sheets

(58) Field of Classification Search
CPC .... G06Q 20/105; G06Q 20/206; G06Q 30/04; G06Q 30/0207; G06Q 30/0641; G06Q 30/0269; G06Q 30/0601; G06Q 20/4014; G06Q 20/42; G06Q 30/0241; G06Q 10/0631; G06Q 10/087; G06F 2221/2111; G06F 8/36; G06F 21/6218; G06F 3/048; G06F 17/30; G06F 21/32
See application file for complete search history.

(56) References Cited

U.S. PATENT DOCUMENTS

| | | | |
|---|---|---|---|
| 8,494,576 B1 | 7/2013 | Bye et al. | |
| 8,566,168 B1 | 10/2013 | Bierbaum et al. | |
| 8,577,731 B1 | 11/2013 | Cope et al. | |
| 2002/0002534 A1* | 1/2002 | Davis | G06Q 20/04 705/39 |
| 2003/0028458 A1* | 2/2003 | Gaillard | G06Q 20/04 705/35 |
| 2005/0033686 A1* | 2/2005 | Peart | G06Q 20/00 705/39 |
| 2005/0102188 A1* | 5/2005 | Hutchison | G06Q 20/02 705/39 |
| 2006/0237528 A1 | 10/2006 | Bishop et al. | |
| 2007/0262138 A1* | 11/2007 | Somers | G06Q 20/341 235/380 |
| 2009/0143104 A1* | 6/2009 | Loh | G06Q 20/32 455/558 |
| 2011/0202466 A1 | 8/2011 | Carter | |
| 2011/0321133 A1* | 12/2011 | Grieve | G06F 21/31 726/4 |
| 2012/0191527 A1* | 7/2012 | Reichert | G06Q 30/0242 705/14.41 |
| 2012/0271697 A1 | 10/2012 | Gilman et al. | |
| 2013/0013433 A1 | 1/2013 | Rose et al. | |
| 2013/0124417 A1* | 5/2013 | Spears | G06Q 20/40 705/44 |
| 2013/0144756 A1 | 6/2013 | Farrarons et al. | |
| 2014/0032408 A1* | 1/2014 | Shin | G06Q 20/3221 705/44 |
| 2015/0019443 A1* | 1/2015 | Sheets | G06Q 20/3278 705/71 |
| 2015/0172404 A1* | 6/2015 | Sathish | H04W 12/06 709/217 |
| 2016/0132859 A1* | 5/2016 | Green | G06Q 20/223 705/17 |

OTHER PUBLICATIONS

"EMV and Encryption + Tokenization: A Layered Approach to Security," [online] First Data Thought Leadership, First Data Corporation © 2012 [retrieved Jan. 2, 2014] retrieved from the Internet: <http://www.firstdata.com/downloads/thought-leadership/EMV-Encrypt-Tokenization-WP.PDF>, 12 pg.

Attard, A. et al., "A Novel Card-Present Payment Scheme using NFC Technology," Royal Holloway, Univ. of London, Thesis No. 070428977, Mar. 28, 2010-2011 [retrieved Jan. 2, 2014] retrieved from the Internet: <http://www.ma.rhul.ac.uk/static/techrep/2012/MA-2012-07.pdf>, 98 pg.

"Mastercard Best Practices for Mobile Point of Sale Acceptance," [online] MasterCard, Nov. 2013, [retrieved Jan. 2, 2014] retrieved from the Internet: <http://www.mastercard.com/us/company/en/docs/MasterCard_Mobile_Point_Of_Sale_Best_Practices.pdf>, 15 pg.

* cited by examiner

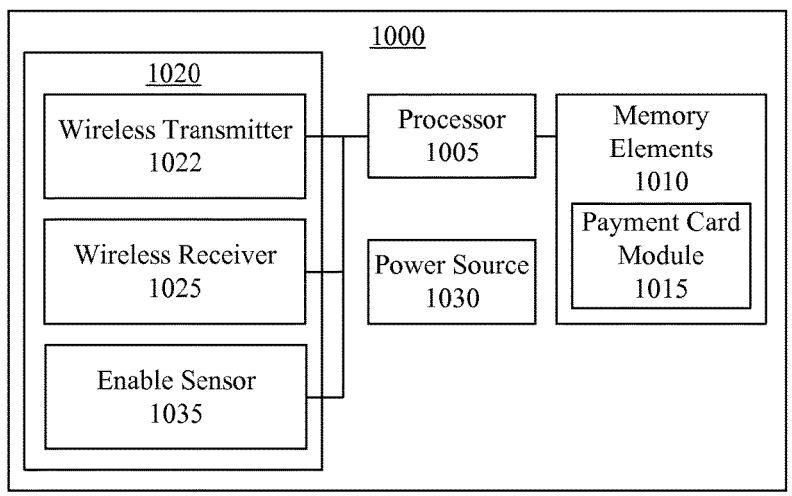
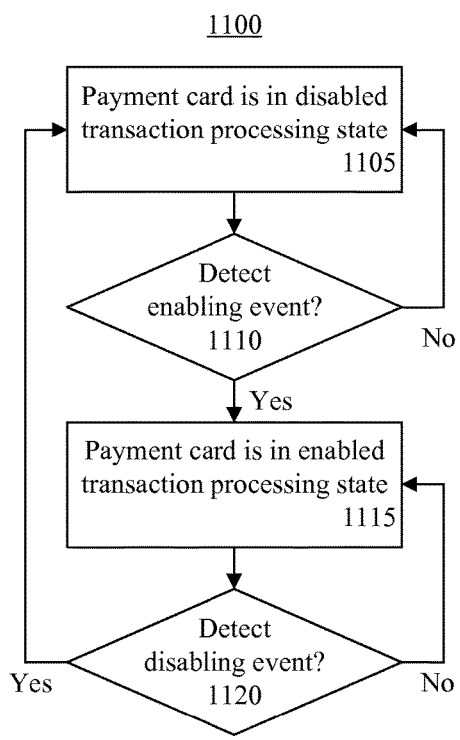
FIG. 10
FIG. 11

SECURE PAYMENT CARD

CROSS-REFERENCE TO RELATED APPLICATIONS

This application claims the benefit of Provisional Patent Application No. 61/908,127 filed on Nov. 24, 2013, which is fully incorporated herein by reference.

BACKGROUND

Payment cards are widely used in financial transactions to pay for goods and/or services. Examples of payment cards include, but are not limited to, credit cards, charge cards, gift cards, debit or bank cards, and the like. As usage of payment cards continues to increase, so too have attempts to compromise payment cards and initiate fraudulent transactions.

Near Field Communication (NFC) is an example of a technology added to modern payment cards. An NFC device may be incorporated into a payment card so that when a user places the payment card within a defined range of a merchant system equipped with a payment card reader, e.g., a point of sale (POS) system, payment for a financial transaction may be provided without the need for physically contacting the payment card to any part of the merchant system as is the case with magnetic strips, for example.

While NFC equipped payment cards (NFC payment cards) are intended to provide an increased level of security, NFC payment cards still have security vulnerabilities. NFC payment cards utilize radio frequency (RF) communications during a financial transaction. Because RF communications pass through clothing and other accessories, the NFC payment card may be charged while still located in the owner's pocket, purse, wallet, or briefcase. In consequence, an NFC payment card is vulnerable to attack in that the NFC payment card may be charged without the permission and/or knowledge of the owner. Known methods of protection, e.g., enclosing the NFC payment card in a metallic case, tend to be cumbersome to carry and use.

SUMMARY

A payment card includes interface circuitry and a processor coupled to the interface circuitry. The processor initiates executable operations using the interface circuitry as part of a transaction. The executable operations include receiving a certificate from a merchant system using the interface circuitry, encrypting the certificate, payment card identifying information, and a request for merchant system authentication forming encrypted authentication data, and sending, using the interface circuitry, the encrypted authentication data to the merchant system with an instruction to forward the encrypted authentication data to an authorization system for the payment card. The merchant system is unable to decrypt the encrypted authentication data. The executable operations include receiving, using the interface circuitry, an encrypted response originating from the authorization system and forwarded to the payment card by the merchant system. The merchant system is unable to decrypt the encrypted response. The executable operations also include decrypting the encrypted response and determining whether the merchant system is authenticated according to the response.

A method includes receiving, within a payment card, a certificate for a merchant system for a transaction, encrypting the certificate, payment card identifying information, and a request for merchant system authentication forming encrypted authentication data using a processor, and sending the encrypted authentication data to the merchant system with an instruction to forward the encrypted authentication data to an authorization system for the payment card. The merchant system is unable to decrypt the encrypted authentication data. The method includes receiving an encrypted response originating from the authorization system and forwarded to the payment card by the merchant system. The merchant system is unable to decrypt the encrypted response. The method further includes decrypting the encrypted response using the processor and determining whether the merchant system is authenticated according to the response.

A computer program product includes a computer readable storage medium having program code stored thereon. The program code is executable by a processor to perform a method. The method includes receiving, using the processor, a certificate for a merchant system for a transaction, encrypting the certificate, payment card identifying information, and a request for merchant system authentication forming encrypted authentication data using the processor, and sending, using the processor, the encrypted authentication data to the merchant system with an instruction to forward the encrypted authentication data to an authorization system for the payment card. The merchant system is unable to decrypt the encrypted authentication data. The method includes receiving, using the processor, an encrypted response originating from the authorization system and forwarded to the payment card by the merchant system. The merchant system is unable to decrypt the encrypted response. The method further includes decrypting the encrypted response using the processor and determining, using the processor, whether the merchant system is authenticated according to the response.

A payment card includes interface circuitry having an optical receiver detecting an optical signal while the payment card is in a disabled transaction processing state. The payment card includes a processor coupled to the interface circuitry. The processor determines that the optical signal is from a merchant system. Responsive to determining that the optical signal is from the merchant system, an enabled transaction processing state is implemented within the payment card.

A method includes receiving an optical signal using an optical receiver within interface circuitry of a payment card while the payment card is in a disabled transaction processing state, determining, using a processor, that the optical signal is from a merchant system, and, responsive to determining that the optical signal is from the merchant system, implementing an enabled transaction processing state within the payment card.

A computer program product includes a computer readable storage medium having program code stored thereon. The program code is executable by a processor to perform a method. The method includes receiving an optical signal using an optical receiver within interface circuitry of a payment card while the payment card is in a disabled transaction processing state, determining, using the processor, that the optical signal is from a merchant system, and, responsive to determining that the optical signal is from the merchant system, implementing an enabled transaction processing state within the payment card.

A payment card includes a shielded optical receiver, an unshielded optical receiver, a wireless transmitter, and a processor coupled to the shielded optical receiver, the unshielded optical receiver, and the wireless transmitter. The processor initiates executable operations including detecting, using the shielded optical receiver, an optical signal and, responsive to detecting the optical signal, disabling transaction processing within the payment card.

A method of preventing fraudulent transactions using a payment card includes detecting, using a shielded optical receiver of the payment card, an optical signal and, responsive to detecting the optical signal, disabling transaction processing within the payment card using a processor.

A computer program product includes a computer readable storage medium having program code stored thereon. The program code is executable by a processor to perform a method. The method includes detecting, using a shielded optical receiver of the payment card under control of the processor, an optical signal and, responsive to detecting the optical signal, disabling transaction processing within the payment card using the processor.

A payment card includes interface circuitry comprising a sensor and a processor coupled to the interface circuitry. The processor initiates operations including detecting, using the sensor, an enabling event for a transaction, detecting a presence of a merchant system, and, responsive to detecting the enabling event and the presence of the merchant system, implementing an enabled transaction processing state within the payment card.

A method of preventing fraudulent transactions using a payment card includes detecting, using a sensor and a processor of the payment card, an enabling event for a transaction, detecting a presence of a merchant system, and responsive to detecting the enabling event and the presence of the merchant system, implementing an enabled transaction processing state within the payment card using the processor.

A computer program product includes a computer readable storage medium having program code stored thereon. The program code is executable by a processor to perform a method. The method includes detecting, using a sensor of the payment card and the processor, an enabling event for a transaction, detecting a presence of a merchant system using the processor, and responsive to detecting the enabling event and the presence of the merchant system, implementing an enabled transaction processing state within the payment card using the processor.

A payment card includes interface circuitry and a processor coupled to the interface circuitry. The processor initiates executable operations using the interface circuitry as part of a transaction. The executable operations include receiving a first message originating from an authorization system and forwarded to the payment card by the merchant system, processing the first message, and sending a second message to the merchant system. The second message includes an instruction determined according to the processing of the first message. The instruction is executed by the merchant system and causes the merchant system to perform an action specified by the instruction.

A method of transaction processing using a payment card includes receiving, using a processor of the payment card, a first message originating from an authorization system and forwarded to the payment card by the merchant system, processing the first message using the processor, and sending a second message to the merchant system. The second message includes an instruction determined according to the processing of the first message. The instruction is executed by the merchant system and causes the merchant system to perform an action specified by the instruction.

A computer program product includes a computer readable storage medium having program code stored thereon. The program code is executable by a processor to perform a method. The method includes receiving, using the processor, a first message originating from an authorization system and forwarded to a payment card by the merchant system, processing the first message using the processor, and sending a second message to the merchant system using the processor. The second message includes an instruction determined according to the processing of the first message. The instruction, when executed by the merchant system, causes the merchant system to perform an action.

BRIEF DESCRIPTION OF THE SEVERAL VIEWS OF THE DRAWINGS

FIG. 5-1 is a flow chart illustrating an exemplary method of transaction processing.

FIG. 5-2 is a flow chart illustrating an exemplary method of merchant system authentication.

FIG. 10 is a block diagram illustrating another exemplary architecture for a payment card.

FIG. 11 is a flowchart illustrating another exemplary method of preventing fraudulent transactions using a payment card.

DETAILED DESCRIPTION

Figure 1:
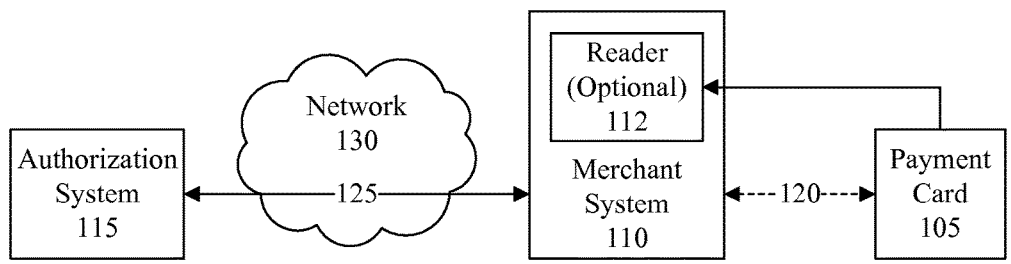
FIG. 1 is a block diagram illustrating an example of a transaction processing system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to financial transaction processing and, more particularly, to the use of payment cards for conducting financial transactions. In accordance with the inventive arrangements disclosed herein, payment card(s), architectures, and processes are described that facilitate financial transaction processing which may reduce the occurrence of fraudulent financial transactions. A payment card is configured to communicate with a merchant system. In one aspect, the payment card uses wireless communication technologies such as optical transmitters and/or optical receivers, radio frequency (RF) transmitters and/or radio frequency receivers, etc. A payment card, as described within this disclosure, may include both optical and RF transmitters and/or receivers or various other combinations. In another aspect, the payment card may include circuitry that physically contacts a merchant system payment card interface thereby communicatively linking the payment card with the merchant system for communication.

In any case, the payment card may include circuitry that is configured to communicate with a merchant system. In one aspect, the payment card is configured to instruct the merchant system to conduct one or more operations on behalf of the payment card. In this sense, the payment card utilizes the merchant system as an intermediary to communicate with one or more other networked systems thereby taking advantage of any network adapters that may be included within the merchant system, but not included in the payment card itself.

The inventive arrangements described within this disclosure may be implemented as a system such as a data processing system having a form factor the same as, or similar to, a wallet sized credit and/or debit card, a device such as a machine readable storage medium storing program code that, when executed, causes a processor to perform one or more operations, a process, or the like. Further aspects and advantages relating to the inventive arrangements will be described in greater detail with reference to the drawings below.

Several definitions that apply throughout this document now will be presented. As defined herein, the term "computer readable storage medium" means a storage medium that contains or stores program code for use by or in connection with an instruction execution system, apparatus, or device. As defined herein, a "computer readable storage medium" is not a transitory propagating signal per se.

As defined herein, the term "processor" means at least one hardware circuit (e.g., a semiconductor integrated circuit) configured to carry out one or more processes. In one aspect, the processor executes instructions contained in program code. In another aspect, the processor is implemented using circuitry that is configured to carry out one or more processes without executing program code. Examples of a processor include, but are not limited to, a central processing unit (CPU), an array processor, a vector processor, a digital signal processor (DSP), a field-programmable gate array (FPGA), an application specific integrated circuit (ASIC), a controller, and/or controller circuit. A processor may perform one or more operations and also coordinate operation of one or more other components coupled to, or controlled by, the processor.

As defined herein, the term "automatically" means without user intervention. As defined herein, the term "user" means a person and, in particular, a human being.

As defined herein, a "payment card" means a system or device that is usable to provide payment for a good or service at a merchant system. A payment card also may be a "stored value card." A payment card may have a form factor that is the same as, or similar to, that of a credit and/or debit card. A payment card includes at least one processor. A payment card includes interface circuitry through which the payment card communicates with the merchant system. A payment card may, but need not, include at least one wireless transmitter and at least one wireless receiver as part of the interface circuitry.

As defined herein, a "merchant system" means a financial transaction processing system utilized by a seller of goods and/or services that is configured to operate with, and/or accept payment from, a payment card for a financial transaction. Accordingly, a merchant system includes a device or other peripheral that communicates with the payment card over one or more short-range, wireless communication channels or by directly contacting an interface of the payment card. Examples of merchant systems include, but are not limited to, a point of sale system (POS), a self-service check-out POS, a kiosk, a price checking merchant system, or the like. A merchant system further may include one or more additional data processing systems, e.g., back-end servers, coupled to the POS, kiosk, or the like, via a communication channel to perform one or more operations of a financial transaction.

As defined herein, an "authorization system" means a data processing system, configured to communicate with a merchant system over a communication channel to complete a financial transaction. The authorization system responds to requests from the merchant system and provides authorization for the merchant system to accept payment from a user using a payment card of the user. In one arrangement, an authorization system authenticates a merchant system to a payment card by communicating through the merchant system. An exemplary authorization system is a server operated by an issuer of the payment card or a third party that is tasked, by the issuer of the payment card, to provide the merchant system with authorization to charge the payment card.

As defined herein, a "transaction" is a financial transaction in which a user provides payment for one or more goods and/or services to a merchant system using a payment card. Throughout this disclosure, the term "charge" is used and means that the merchant system accepts payment from the payment card of a user, accepts payment from an account linked to the payment card of the user, provides a refund to the payment card of a user, or provides a refund to an account linked to the payment card of the user. The term "charge" is used irrespective of whether the payment card is linked to a credit or charge account, an asset account such as a checking or savings account from which funds are withdrawn in payment for the transaction, or the like.

As defined herein, the term "fraudulent transaction" means a transaction in which a payment card is charged, or an attempt is made to charge the payment card, without the knowledge and/or permission of the user or owner of the payment card, or a transaction in which, when charged to the payment card or an attempt is made to charge the payment card, has one or more data items or details, e.g., total amount, that differ from what is disclosed or otherwise represented to the user or owner of the payment card.

As defined herein, the term "render" or "rendering" means to make digital content available to a user whether through execution, interpretation, playback, display, etc. For example, rendering may include displaying text or an image, playing audio, playing video, displaying a markup language document in a browser, or the like.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an example of a transaction processing system (system) 100. As pictured, system 100 includes a payment card 105, a merchant system 110, and an authorization system 115.

Payment card 105 communicates with merchant system 110 to render payment for goods and/or services as part of a transaction. Payment card 105 is a device and/or system configured to communicate with merchant system 110 through interface circuitry. In one aspect, payment card 105 communicates with merchant system 110 over a short-range wireless communication channel (channel) 120. In another aspect, payment card 105 may communicate with merchant system 110 by being placed in contact with an optional reader 112, or other peripheral, coupled to merchant system 110. Merchant system 110 may be implemented as a data processing system having one or more peripherals and/or network adapters to communicate with payment card 105 over channel 120. As illustrated, merchant system 110 may include a reader 112. Payment card 105 also may be placed in physical contact with reader 112 thereby facilitating communication between merchant system 110 and payment card 105.

The term "channel" is used within this disclosure predominantly in singular form. It should be appreciated, however, that the term "channel" may mean or include more than one communication channel. Channel 120, being implemented as a short-range wireless communication channel, may be implemented as a short-range radio frequency (RF) communication channel. An example of a short-range RF communication channel is a Near Field Communication (NFC) channel. Channel 120 also may be implemented as a short-range optical communication channel. In still another aspect, channel 120 may represent, or include, one or more short-range RF communication channels and/or one or more short-range optical communication channels. In this regard, channel 120 may be implemented as a peer-to-peer communication channel.

Merchant system 110 further may include one or more network adapters used to communicate with authorization system 115 over communication channel 125. Communication channel 125 is a long-range communication channel established over a network 130. Network 130 is the medium used to provide communication links between merchant system 110 and authorization system 115. Network 130 may include connections, such as wire, wireless communication links, or fiber optic cables. Network 130 may be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

Figure 2:
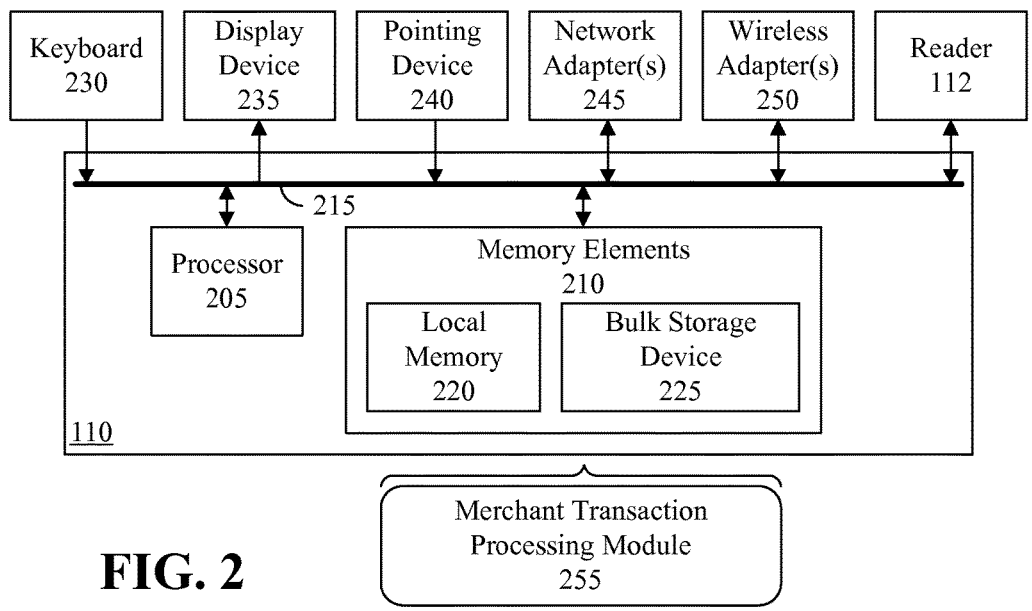
FIG. 2 is a block diagram illustrating an exemplary implementation of merchant system.

FIG. 2 is a block diagram illustrating an exemplary implementation of merchant system 110. Merchant system 110 may include at least one processor (e.g., a central processing unit) 205 coupled to memory elements 210 through a system bus 215 or other suitable circuitry. As such, merchant system 110 can store program code within memory elements 210. Processor 205 executes the program code accessed from memory elements 210 via system bus 215 or the other suitable circuitry.

In one aspect, merchant system 110 is implemented as a computer or other programmable data processing system that is suitable for storing and/or executing program code and performing the operations described within this disclosure. It should be appreciated, however, that merchant system 110 can be implemented in the form of any system including a processor and memory that is capable of performing and/or initiating the functions and/or operations described within this disclosure. Further, merchant system 110 can be implemented in any of a variety of different form factors including, but not limited to, a POS, a cash register, a kiosk, a self-serve POS, or the like. In some cases, merchant system 110 may be implemented as a mobile communication device such as a smart phone.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 can be implemented as a hard disk drive (HDD), solid state drive (SSD), or other persistent data storage device. For example, memory elements 210 may include one or more computer readable storage medium(s). Merchant system 110 also can include one or more cache memories (not shown) that provide temporary storage of at least some program code in order to reduce the number of times program code must be retrieved from bulk storage device 225 during execution.

Input/output (I/O) devices such as a keyboard 230, a display 235, a pointing device 240, and reader 112 optionally may be coupled to merchant system 110. The I/O devices may be coupled to merchant system 110 either directly or through intervening I/O controllers. One or more network adapter(s) 245 also may be coupled to merchant system 110 to enable merchant system 110 to become coupled to other systems, computer systems, remote printers, and/or remote storage devices through intervening private or public networks. Modems, cable modems, wireless transceivers, and Ethernet cards, are examples of different types of network adapters 245 that can be used with merchant system 110.

Further, one or more wireless adapters 250 may be coupled to merchant system 110 to enable merchant system to become coupled to a payment card over short-range wireless communication channels. Wireless adapter(s) 250 may be one or more of a wireless transceiver, a wireless transmitter, and/or a wireless receiver. Wireless adapter(s) 250 may be implemented as RF, optical, or both RF and optical transmitters and/or receivers. Wireless adapters 250, for example, may support a variety of existing modulation schemes and encoding schemes. Exemplary modulation and/or encoding schemes that may be supported by wireless adapters 250 may include, but are not limited to, amplitude modulation (AM), amplitude-shift keying (ASK), pulse-position modulation, bi-phase/Manchester encoding, or the like. In further illustration, wireless adapters 250 also may support any of a variety of serial communications including, but not limited to, IrDA (IrPHY, SIR, IrLAP, IrMLP, IrCOMM, etc.), Consumer Infrared (CIR), ASYNC 8-N-1, Optimux, Serial Line Internet Protocol (SLIP), Compressed SLIP (CSLIP), etc. Still, it should be appreciated that in other aspects, wireless adapters 250 may communicate by sending and/or receiving a carrier signal where the signal, having a specific frequency, is either present or not, but otherwise is not modulated with data.

As pictured in FIG. 2, memory elements 210 can store a merchant transaction processing module (module) 255. Module 255 is implemented as executable program code. Module 255 is executed by merchant system 110 and, as such, is considered an integrated part of merchant system 110. Merchant system 110, in executing module 255, performs the various operations described herein as being performed by a merchant system. Module 255, including any parameters and/or attributes utilized by module 255, are functional data structures that impart functionality when employed as part of merchant system 110.

FIG. 2 is provided as an illustrative example of a merchant system. In this regard, FIG. 2 is not intended as a limitation of the inventive arrangements described within this disclosure. A merchant system may be implemented in any of a variety of different form factors, utilize dedicated circuitry, e.g., a state machine, in lieu of a processor or CPU, without limitation. In some cases, for example, a merchant system may include multiple, networked systems such as one or more payment terminals or point of sale systems that communicate with a back-end system implemented as one or more servers.

Figure 3:
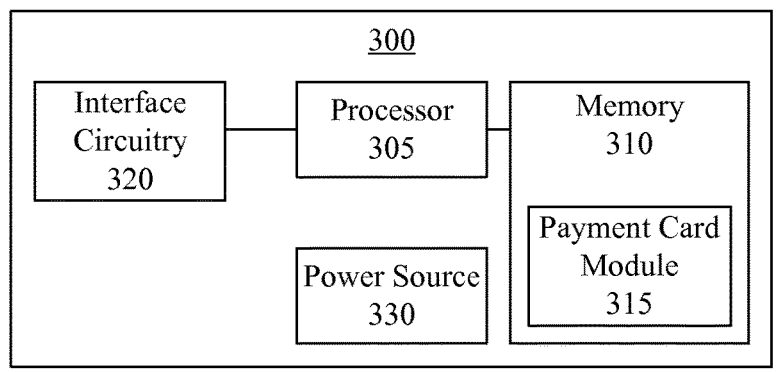
FIG. 3 is a block diagram illustrating an exemplary architecture for a payment card.

FIG. 3 is a block diagram illustrating an exemplary architecture 300 for a payment card. Architecture 300 may be used to implement payment card 105 as described with reference to FIG. 1. As pictured, architecture 300 includes a processor 305, a memory 310, and interface circuitry 320. Architecture 300 also includes a power source 330. For purposes of simplicity and ease of illustration, wires and/or connections from power source 330 to the various elements of architecture 300 are not shown. It should be appreciated, however, that the elements of architecture 300 obtain power from power source 330.

Processor 305 may be implemented as previously described within this disclosure. Processor 305 is coupled to memory 310. Memory 310 may include one or more physical memory devices including one or more RAM devices, one or more cache memories, one or more read-only memory (ROM) devices, one or more flash memory devices, one or more electrically erasable programmable read-only memory (EEPROMs) devices, or the like. As pictured, memory 310 stores a payment card module (module) 315. Module 315 is implemented as executable program code. Module 315 is executed by processor 305 and, as such, is considered an integrated part of the payment card that architecture 300 is used to implement. Architecture 300, and, in particular processor 305, in executing module 315, performs the various operations described herein as being performed by a payment card by controlling and/or coordinating operation of interface circuitry 320. Module 315, including any parameters and/or attributes utilized by module 315, are functional data structures that impart functionality when employed as part of a payment card. It should be appreciated that in embodiments where processor 305 does not execute program code, module 315 is not included or stored in memory 310.

Interface circuitry 320 is coupled to processor 305. Interface circuitry 320 is configured to conduct two-way communication with a merchant system. In one aspect, interface circuitry 320 may include a short range wireless transmitter and/or receiver. In another aspect, interface circuitry 320 may include one or more contacts, e.g., pins, on the surface of a payment card using architecture 300. In that case, contacts of interface circuitry 320 may physically contact, or touch, contacts of a card reader coupled to the merchant system. Interface circuitry 320 may include a clock contact, one or more input contacts, one or more output contacts, a power contact, a ground contact, and/or the like. In the example where interface circuitry 320 includes contacts, communication between a payment card using architecture 300 and a merchant system requires physical contact.

Power source 330 provides electrical power to processor 305, memory elements 310, and interface circuitry 320. In one aspect, power source 330 is implemented as a battery within the payment card. Any of a variety of known battery types may be used that may be incorporated into a payment card form factor and provide sufficient power for operation of the various elements of architecture 300. In one example, flexible battery technologies may be used to implement power source 330. A battery used as power source 330 may be rechargeable.

In another aspect, power source 330 may be implemented as circuitry including an antenna that derives power from an electromagnetic or RF field, e.g., from RF signals, in which the payment card is located. The circuitry implementing power source 330 may or may not be flexible. In either case, power from the RF field may be obtained and used as received and/or stored for subsequent use. For example, power may be derived from an RF field using an antenna (not shown) within the payment card and stored using one or more capacitive circuit elements. Exemplary capacitive elements that may be used to store power include, but are not limited to, capacitive structures, including arrays, that may be implemented in a semiconductor integrated circuit, flexible super-capacitors, and the like. Power further may be derived using electro-magnetic induction.

Using a power source 330 that may derive power from an RF field, power source 330 may be charged from an RF field generated by a merchant system. The power may be stored, for example, using super-capacitors. The stored power may be used by the payment card in a subsequent transaction including one in which the merchant system is unable to provide power.

In still another aspect, power source 330 may be a solar cell embedded on and/or within the payment card. Inclusion of a solar cell allows various light sources, including any light sources that may be part of a merchant system such as LEDs, to charge or provide power to architecture 300.

Those skilled in the art will recognize that power source 330 may be formed of a combination of one or more or all of the aforementioned technologies. For example, a battery may be included in combination with a solar cell, in combination with a circuit configured to derive power from an RF field, or the like. Capacitive structures capable of storing charge may be incorporated with a solar cell, with a battery, etc.

While architecture 300 is described as being enabled for two-way communications, it should be appreciated that a payment card using architecture 300 also may include other features not described in detail with reference to FIG. 3. For example, a payment card using architecture 300 also may include a magnetic strip, smart chip technology, or the like. Architecture 300 is described for purposes of illustration and not limitation.

Figure 4:
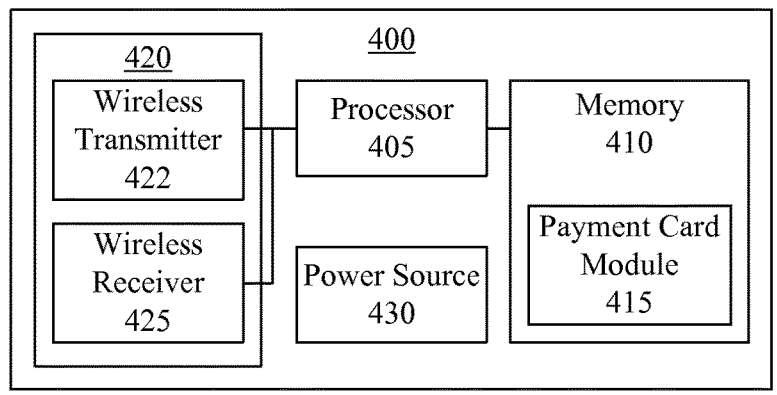
FIG. 4 is a block diagram illustrating another exemplary architecture for a payment card.

FIG. 4 is a block diagram illustrating another exemplary architecture 400 for a payment card. Architecture 400 may be used to implement payment card 105 as described with reference to FIG. 1. As pictured, architecture 400 includes a processor 405, a memory 410, and interface circuitry 420. In the example of FIG. 4, interface circuitry 420 includes a wireless transmitter 422 and a wireless receiver 425. Architecture 400 is substantially similar to architecture 300 of FIG. 3. Accordingly, processor 405, memory elements 410, payment card module 415, and power source 430 are not described in further detail. As noted, in embodiments where processor 405 does not execute program code, module 415 is not included or stored in memory 410.

Wireless transmitter 422 is coupled to processor 405. Wireless transmitter 422 is configured to send messages to a merchant system over a short-range wireless communication channel under control of processor 405.

In one aspect, wireless transmitter 422 is an RF transmitter configured to send RF signals. Wireless transmitter 422, for example, may be implemented as an NFC transmitter. In that case, wireless transmitter 422 may be implemented to send messages NFC. NFC includes any of a variety of communication standards, protocols, and/or data exchange formats including, but not limited to, ISO/IEC 14443, FeliCa, ISO/IEC 18092, GSMA NFC Standards, the NFC Forum data format called "NDEF," or the like. NFC may be used, for example, to establish so called "Wi-Fi" and/or Bluetooth communication channels.

In another aspect, wireless transmitter 422 may be implemented as an optical transmitter configured to send optical signals. In one aspect, the optical signals may be within the visible portion of the electromagnetic spectrum. In another aspect, the optical signals may be located outside of the visible portion of the electromagnetic spectrum. An example of an optical communication outside of the visible portion of the electromagnetic spectrum includes an infrared signal when wireless transmitter 422 is implemented as an infrared transmitter. Exemplary implementations of an optical transmitter include, but are not limited to, a light emitting diode (LED), a laser diode, or the like.

Wireless receiver 425 is coupled to processor 405. Wireless receiver 425 is configured to receive messages from a merchant system over a short-range wireless communication channel under control of processor 405.

In one aspect, wireless receiver 425 is an RF receiver configured to receive RF signals from a merchant system. Wireless receiver 425, for example, may be implemented as an NFC receiver. In that case, wireless receiver 425 may be implemented to receive RF signals using NFC.

In another aspect, wireless receiver 425 may be implemented as an optical receiver, e.g., an optical sensor, configured to receive optical signals from a merchant system. In one aspect, the optical signals received by wireless receiver 425 may be within the visible portion of the electromagnetic spectrum. In another aspect, the optical signals received by wireless receiver 425 may be located outside of the visible portion of the electromagnetic spectrum.

While wireless transmitter 422 and wireless receiver 425 are depicted as separate units, it should be appreciated that wireless transmitter 422 and wireless receiver 425 may be combined into a single, integrated transceiver unit. In another illustrative example, wireless transmitter 422 and wireless receiver 425 may be implemented as an NFC device that is operable to send and receive wireless NFC communications.

While architecture 400 is described as being enabled for wireless communications, it should be appreciated that a payment card using architecture 400 also may include other features not described in detail with reference to FIG. 4. For example, a payment card using architecture 400 also may include a magnetic strip, smart chip technology, or the like. Architecture 400 is described for purposes of illustration and not limitation.

Figures 1, 5:
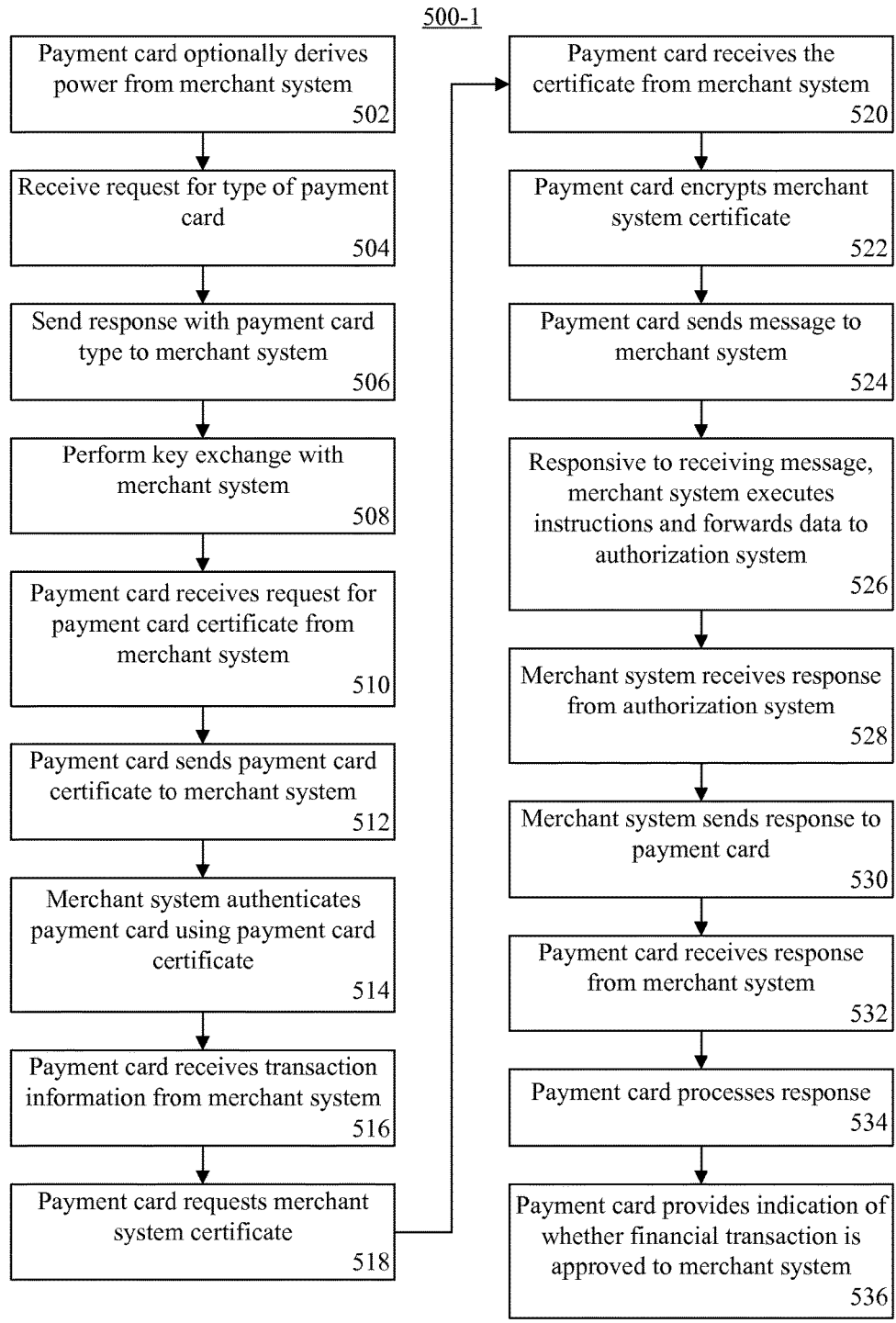
Figures 2, 5:
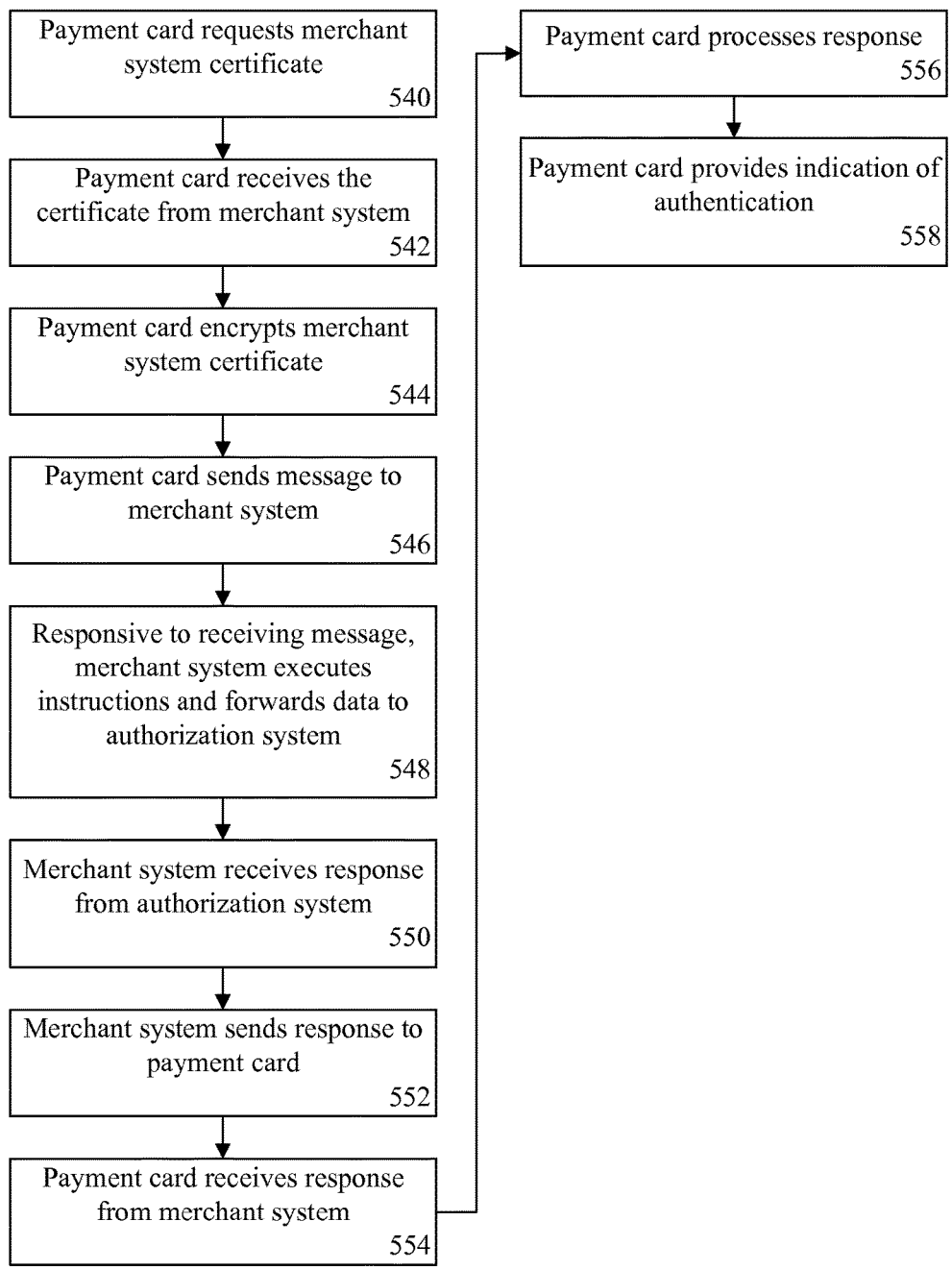

FIG. 5-1 is a flow chart illustrating an exemplary method 500-1 of transaction processing. Method 500-1 may be implemented within a transaction processing system as described with reference to FIG. 1. Method 500-1 illustrates exemplary operations performed by a payment card as described within this disclosure, a merchant system, and an authentication system. One or more other parties may be involved, though such actions are not described.

In one aspect, communication between the payment card and the merchant system takes place over a short-range, wireless communication channel, whether RF, optical, or both. In another aspect, communication between the payment card and the merchant system takes place via contacts located on a surface of the payment card in physical contact with contacts of a reader of the merchant system.

Method 500-1 can begin in a state where a user is attempting to pay for one or more goods and/or services using a payment card at a merchant system. In one aspect, the payment card has detected the presence of the merchant system. In another aspect, the merchant system has detected the presence of the payment card. The payment card and the merchant system, for example, each may send and/or receive one or more messages or signals to perform a "handshaking" process thereby indicating presence to one another.

In block 502, the payment card optionally derives power from the merchant system. For example, the payment card may derive power from an RF field, from a light source, or the like. In block 504, the payment card receives, over the short-range wireless communication channel, a request for a type of payment card from the merchant system. In block 506, the payment card sends a response to the merchant system specifying the payment card type. The type of payment card may include, but it not limited to, information such as the issuing entity, the type of payment card, e.g., MasterCard®, Visa®, American Express®, etc., and other identifying information that may be used by the merchant system to determine a particular protocol for handling the transaction with the payment card.

In one aspect, responsive to receiving the payment card type from the payment card, the merchant system matches the payment card type to a particular protocol that is to be used in carrying out the transaction. The protocol may specify communication standards and/or which communication channels are to be used to send information to the payment card and similar information for receiving information from the payment card. The protocol may indicate, for example, that messages to the payment card are specified as optical signals, while messages are received from the card as RF signals. In another example, messages from the payment card may be optical signals, while messages sent to the payment card are RF signals. In a further, example, all messages exchange between the merchant system and the payment card may be RF signals or may be optical signals. In yet another example, one or more preliminary messages may be sent or received as optical signals, while subsequent messages after the preliminary messages are sent and/or received as RF signals. The protocol further may specify, for example, whether the merchant system will execute instructions provided by the payment card and/or the authorization system, whether the merchant system is to provide a certificate to the payment card, whether and how key exchange may be performed, or the like.

In block 508, the payment card and the merchant system perform key exchange operations. For example, the payment card and the merchant system may exchange keys that may be used to encrypt further messages exchanged between the two entities. In one aspect, subsequent to block 508, further communication between the payment card and the merchant system may be encrypted using the exchanged key(s).

In block 510, the payment card receives a request for a payment card certificate from the merchant system. The certificate may be any of a variety of known certificate types, e.g., a PKI certificate, which may be used for purposes of authentication. In block 512, the payment card sends the payment card certificate to the merchant system.

In block 514, the merchant system optionally contacts the authorization system and/or a certificate issuing authority to authenticate the payment card using the payment card certificate. Method 500-1 continues with the understanding that the payment card has been authenticated.

In block 516, the payment card receives transaction information sent by the merchant system. The transaction information may include, but is not limited to, a total amount of the goods and/or services being purchased, a time, a date, store and/or store location identifiers, and/or any other data items required to obtain approval from the authorization system for the transaction.

In block 518, the payment card sends a message to the merchant system. The message requests the merchant system certificate. In block 520, the payment card receives the certificate of the merchant system. In block 522, the payment card encrypts the merchant system certificate and/or one or more or all of the items of transaction information received from the merchant system. As part of the encryption, in block 522, the payment card also may encrypt payment card identifying information and a request for merchant system authentication. In one aspect, the payment card identifying information, which may be stored in the payment card, uniquely identifies the payment card. In another aspect, the payment card identifying information may specify or identify the payment card type and/or issuer. The merchant system certificate, the payment card identifying information, and the request for authentication may be collectively referred to as authentication data and encrypted authentication data once encrypted. The authentication data and the transaction information are encrypted using an encryption technique that the merchant system is unable to decrypt. For example, the processor of the payment card encrypts the authentication data and transaction information using a key that is shared with the authorization system, but not with the merchant system. In this regard, the encryption technique applied to the authentication data and the transaction information is a different encryption technique that may be used for other communication between the merchant system and the payment card. In one aspect, the different encryption techniques may be entirely different algorithms or forms of encryption. In another aspect, different encryption techniques may mean that the same algorithm or form of encryption is used, but with a different key for each "different" encryption technique.

In block 524, the payment card sends a message to the merchant system. The message may include two or more separate sections. A first section of the message includes data that is to be used by the merchant system. As such, the first section of the message is either unencrypted or is encrypted using the key(s) exchanged in block 508. As such, the merchant system is able to decrypt the first section of the message. A second section of the message is encrypted using the encryption technique that the merchant system is unable to decrypt.

For example, the first section may include one or more instructions that are to be executed or performed by the merchant system. The instructions, when executed by the merchant system, cause the merchant system to operate as an intermediary between the payment card and the authorization system. The second section of the message includes the encrypted authentication data, any encrypted transaction information, etc.

In block 526, the merchant system executes the instructions received in the message from the payment card. For example, responsive to receiving the message, the merchant system decrypts the first section of the message if necessary and begins executing the instructions. In executing the instructions, the merchant system sends the second section of the message, or portions thereof, as enumerated in the instructions, to a network address also enumerated in the instructions. The network address is the network address of the authorization system. The second section of the message is sent by the merchant system over a long-range communication channel.

In one aspect, the instructions may specify a particular communication channel to be used in sending the enumerated data items to the network address. For example, if the merchant system is able to communicate over more than one different type of network connection, the instructions may specify the particular network connection to be used in communication with the network address. Further, the instructions may specify a particular communication protocol to be used, or the like. Execution of the instructions by the merchant system effectively provides the payment card with long-range communications and causes the merchant system act as an agent or proxy for communication between the payment card and the authorization system.

In illustration, responsive to the instructions, the merchant system sends the encrypted authentication data to the authorization system. The merchant system further, responsive to the instructions, may send the encrypted transaction information to the authorization system. Because the transaction information and the authentication data are encrypted using the encryption technique that the merchant system is unable to decrypt, the content passed from the payment card to the authorization system is not read by, or known to, the merchant system.

The authorization system, however, is able to decrypt the authentication data and the transaction information. Accordingly, the authorization system decrypts data received from the merchant system and determines whether to authorize the transaction. As part of the determination whether to authorize the transaction, the authorization system authenticates the merchant system using the decrypted merchant system certificate and any other items of information provided thereto from the payment card. In this regard, whether the authorization system does or does not authorize the transaction may depend upon conventional transaction processing decisions such as whether a user has exceeded and allowed credit amount, but further may include whether the merchant system has been authenticated using the merchant system certificate.

In block 528, the merchant system receives a response from the authorization system. For example, the authorization system sends a response at least partially encrypted using the encryption technique that the merchant system is unable to decrypt. Accordingly, any sections of the response encrypted using the encryption technique may not be read by the merchant system. Other portions not encrypted or encrypted using an encryption technique that the merchant system may decode may specify instructions for forwarding portions of the response to the payment card. As a result, the payment card and the authorization system may freely communicate using the merchant system as a proxy.

In block 530, the merchant system sends the response to the payment card. In one aspect, the merchant system is configured to send the response from the authorization system to the payment card from the instructions in the message sent in block 524. In another aspect, the response received from the authorization system may specify instructions that are executed by the merchant system. The instructions within the response may not be encrypted or may be encrypted using an encryption technique that the merchant system is able to decrypt. Responsive to execution of instructions received in the response from the authorization system, the merchant system sends, e.g., forwards, the response, or a portion thereof, to the payment card. For example, the merchant system forwards at least the portion of the response that may be decrypted by the payment card and authorization system, but not by the merchant system.

As discussed, whereas communications between the merchant system and the authorization system are conducted using a long-range communication channel, communications between the payment card and the merchant system are conducted over a short-range wireless communication channel or through direct contact between the merchant system, e.g., a reader, and the payment card. Accordingly, the merchant system performs any formatting that may be required prior to sending and/or forwarding the response from the authorization system to the payment card.

In block 532, the payment card receives the response, or portion thereof, originating from the authorization system as sent by the merchant system. In block 534, the payment card processes the response. For example, the processor of the payment card may perform any decryption that may be necessary to read data within the response. Further, the processor may evaluate one or more data items received in the response. For example, the processor may read a data item indicating whether the authorization system has approved the transaction. In another example, the payment card determines whether authentication of the merchant system is successful from the response.

In block 536, the payment card provides an indication of whether the transaction is approved to the merchant system. For example, the processor of the payment system, having read the data item indicating whether the authorization system has approved the transaction, can provide the indicator or other representation thereof to the merchant system. In one aspect, the indicator is a transaction identifier or ID provided from the authorization system.

The merchant system continues with processing of the transaction based upon whether or not the transaction has been approved as indicated by the payment card. The merchant system completes the transaction responsive to an indication from the payment card that the transaction has been approved by the authorization system. The merchant system terminates the transaction, or declines the transaction, responsive to an indication from the payment card that the transaction was not approved by the authorization system or if the payment card does not provide any indication within a predetermined amount of time.

In another aspect, in completing the transaction, the merchant system optionally contacts the authorization system independently. The transaction ID provided from the payment card may be used in communication between the merchant system and the authorization system to match the merchant system request to prior transaction information from the payment card. The authorization system may provide the merchant system with further authorization for the transaction responsive to such communications and matching the transaction ID provided from the merchant system with the prior transaction information.

FIG. 5-2 is a flow chart illustrating an exemplary method 500-2 of merchant system authentication. Method 500-2 may be implemented within a transaction processing system as described with reference to FIG. 1. Method 500-2 illustrates exemplary operations performed by a payment card as described within this disclosure, a merchant system, and an authentication system. One or more other parties may be involved, though such actions are not described.

In one aspect, communication between the payment card and the merchant system takes place over a short-range, wireless communication channel, whether RF, optical, or both. In another aspect, communication between the payment card and the merchant system takes place via contacts located on a surface of the payment card in physical contact with contacts of a reader of the merchant system. Method 500-2 illustrates that merchant system authentication may be performed independently of the transaction and, as such, may be incorporated within any of a variety of larger methods of transaction processing. In the example of FIG. 5-2, merchant system authentication may be performed prior to performing any further transaction processing, e.g., after the merchant system and the payment card detect one another's presence and as a condition of charging the payment card.

In block 540, the payment card sends a message to the merchant system. The message requests the merchant system certificate. In block 542, the payment card receives the certificate of the merchant system. In block 544, the payment card encrypts the merchant system certificate, payment card identifying information, and a request for merchant system authentication. As noted, the merchant system certificate, the payment card identifying information, and the request for merchant system authentication are collectively referred to as authentication data. The authentication data are encrypted using an encryption technique that the merchant system is unable to decrypt. For example, the processor of the payment card encrypts the authentication data using a key that is shared with the authorization system, but not with the merchant system. In this regard, the encryption technique applied to the authentication data is a different encryption technique that may be used for other communication between the merchant system and the payment card.

In block 546, the payment card sends a message to the merchant system. The message may include two or more separate sections. A first section of the message includes data that is to be used by the merchant system. As such, the first section of the message is either unencrypted or is encrypted using a key previously exchanged with the merchant system. As such, the merchant system is able to decrypt the first section of the message. A second section of the message is encrypted using the encryption technique that the merchant system is unable to decrypt.

For example, the first section may include one or more instructions that are to be executed or performed by the merchant system. The instructions, when executed by the merchant system, cause the merchant system to operate as an intermediary between the payment card and the authorization system. The second section of the message includes the encrypted authentication data.

In block 548, the merchant system executes the instructions received in the message from the payment card. For example, responsive to receiving the message, the merchant system decrypts the first section of the message if necessary and begins executing the instructions. In executing the instructions, the merchant system sends the second section of the message, or portions thereof, as enumerated in the instructions, to a network address also enumerated in the instructions. The network address is the network address of the authorization system. The second section of the message is sent by the merchant system over a long-range communication channel.

In one aspect, the instructions may specify a particular communication channel to be used in sending the enumerated data items to the network address. Further, the instructions may specify a particular communication protocol to be used, or the like. Execution of the instructions by the merchant system effectively provides the payment card with long-range communications and causes the merchant system act as an agent or proxy for communication between the payment card and the authorization system. The authorization system is able to decrypt the authentication data. The authorization system decrypts data received from the merchant system and authenticates the merchant system using the decrypted merchant certificate.

In block 550, the merchant system receives a response from the authorization system. For example, the authorization system sends a response at least partially encrypted using the encryption technique that the merchant system is unable to decrypt. Accordingly, any sections of the response encrypted using the encryption technique may not be read by the merchant system. Other portions not encrypted or encrypted using an encryption technique that the merchant system may decode may specify instructions for forwarding portions of the response to the payment card. As a result, the payment card and the authorization system may freely communicate using the merchant system as a proxy.

In block 552, the merchant system sends the response to the payment card. In one aspect, the merchant system is configured to send the response from the authorization system to the payment card from the instructions in the message sent in block 546. In another aspect, the response received from the authorization system may specify instructions that are executed by the merchant system. The instructions within the response may not be encrypted or may be encrypted using an encryption technique that the merchant system is able to decrypt. Responsive to execution of instructions received in the response from the authorization system, the merchant system sends, e.g., forwards, the response, or a portion thereof, to the payment card. For example, the merchant system forwards at least the portion of the response that may be decrypted by the payment card and authorization system, but not by the merchant system.

As discussed, whereas communications between the merchant system and the authorization system are conducted using a long-range communication channel, communications between the payment card and the merchant system are conducted over a short-range wireless communication channel or through direct contact between the merchant system, e.g., a reader, and the payment card. Accordingly, the merchant system performs any formatting that may be required prior to sending and/or forwarding the response from the authorization system to the payment card.

In block 554, the payment card receives the response, or portion thereof, originating from the authorization system as sent by the merchant system. In block 556, the payment card processes the response. For example, the processor of the payment card may perform any decryption that may be necessary to read data within the response. Further, the processor may evaluate one or more data items received in the response. For example, the processor of the payment card determines, from the response, whether the merchant system was authenticated.

In block 558, the payment card provides to the merchant system an indication of whether the merchant system is authenticated. For example, the processor of the payment card, having read the response from the authentication system, can provide the indicator or other representation thereof to the merchant system indicating the merchant system was authenticated or was not authenticated. The payment card, for example, will not continue or perform any further transaction processing if the merchant system is not authenticated. In another aspect, the payment card may simply not respond to the merchant system in the event that the merchant system is not authenticated by the authorization system.

Figure 6:
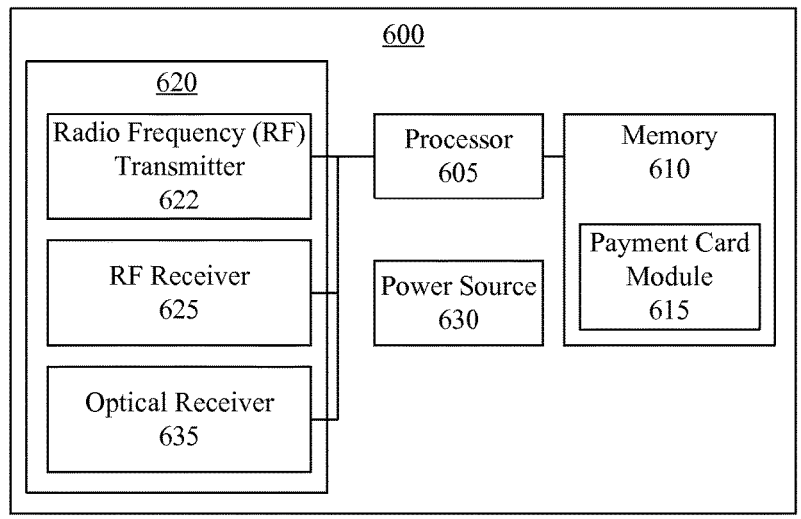
FIG. 6 is a block diagram illustrating another exemplary architecture for a payment card.

FIG. 6 is a block diagram illustrating another exemplary architecture 600 for a payment card. Architecture 600 may be used to implement payment card 105 as described with reference to FIG. 1. As pictured, architecture 600 includes a processor 605, memory 610 storing an executable payment card module 615, interface circuitry 620, and a power source 630. Interface circuitry 620 includes an RF transmitter 622, an RF receiver 625, and an optical receiver 635. As noted, in embodiments where processor 605 does not execute program code, module 615 is not included or stored in memory 610.

Architecture 600 is substantially similar to architecture 300 of FIG. 3. Accordingly, processor 605, memory 610, payment card module 615, and power source 630 are not described in further detail. RF transmitter 622 and RF receiver 625 may be implemented substantially as described with reference to RF implementations of the transmitter and receiver of architecture 300. Architecture 600 includes optical receiver 635, which works cooperatively with RF transmitter 622 and RF receiver 625. As illustrated optical receiver 635 is coupled to processor 605. Further optical receiver 635 obtains power from power source 630 though power signals are not shown in FIG. 6.

Architecture 600 utilizes optical receiver 635 to prevent or minimize fraudulent transactions with a payment card. Processor 605, in executing payment card module 615, maybe programmed to place architecture 600 in a disabled transaction processing state in which transactions are not processed by architecture 600 until such time that optical receiver 635 detects an enabling optical signal. Optical receiver 635 remains active and able to detect an enabling optical signal despite one or more other elements of architecture 600 being disabled and/or architecture 600 being placed in the disabled transaction processing state as described below in further detail.

In one example, architecture 600 is placed in the disabled transaction processing state by processor 605. As defined herein, the phrase "disabled transaction processing state" means that the processor of the payment card does not permit transaction processing to proceed with a merchant system whether by not responding, e.g., not performing or executing any transaction processing operations, or by rendering one or more elements of the payment card temporarily inoperable. In one aspect, for example, while in the disabled transaction processing state, processor 605 disables RF transmitter 622 and/or RF receiver 625. Processor 605 keeps at least one, or both, of RF transmitter 622 and RF receiver 625 disabled until an enabling optical signal is first detected by optical receiver 635. While in the disabled transaction processing state, RF transmitter 622 is not operational and may not transmit wireless signals. Similarly, RF receiver 625 is not operational and may not receive wireless signals.

Processor 605 places architecture 600 in an enabled transaction processing state responsive to detection of the enabling optical signal by optical receiver 635. As defined herein, the phrase "enabled transaction processing state" means that the processor of the payment card places the payment card, and each element of the payment card, in an operable state to perform transaction processing with a merchant system. In the enabled transaction processing state, RF transmitter 622 and RF receiver 625 are enabled and may send wireless signals and receive wireless signals, respectively.

In another example, RF transmitter 622 and/or RF receiver 625 may be operable while architecture 600 is in the disabled transaction processing state, i.e., without architecture 600 first receiving the enabling optical signal. In that case, processor 605 may implement the disabled transaction processing state by not processing or otherwise acting upon any messages received by RF receiver 625. Similarly, processor 605 does not send any messages through RF transmitter 622 while in the disabled transaction processing state.

In still another example, while architecture 600 is in the disabled transaction processing state, processor 605 may simply not perform executable transaction processing operations. It should be appreciated that processor 605 may implement the disabled transaction processing state by not performing transaction processing operations for any of the various architectures described herein regardless of whether the interface circuitry includes transmitters, receivers, and/or contacts.

Responsive to detecting the enabling optical signal, processor 605 places architecture 600 in the enabled transaction processing state. In the enabled transaction processing state, processor 605 operates upon, or responds to, messages received by RF receiver 635 and may send messages through RF transmitter 622. Processor 605, in the enabled transaction processing state, performs transaction processing operations. In the enabled transaction processing state, the payment card is permitted to continue or implement a transaction with a merchant system.

Architecture 600 prevents fraudulent transactions where an attacker attempts a fraudulent transaction by activating the payment card while still stored in a user's pocket, purse, clothing, or the like. Optical receiver 635 first must detect the enabling optical signal sent from a merchant system. Processor 605 may decode the signal to ensure legitimacy of the enabling optical signal. Thus, while a payment card using architecture 600 is stored in a location in which optical receiver 635 is unable to receive or detect the enabling optical signal from the merchant system, architecture 600 remains disabled and incapable of participating in, or providing payment for, a transaction.

While architecture 600 illustrates a single optical receiver, it should be appreciated that architecture 600 may include additional optical receivers. Thus, if a user inadvertently covers one optical receiver, another optical receiver still may be positioned or unobstructed to detect an enabling optical signal from the merchant system. For example, the payment card may include an optical receiver on each of two opposing sides, include more than one optical receiver on one or both sides, etc.

As previously discussed, a payment card using architecture 600 may include a magnetic strip. Further, a payment card using architecture 600 may include smart chip technology or other known elements commonly used for payment cards.

Figure 7:
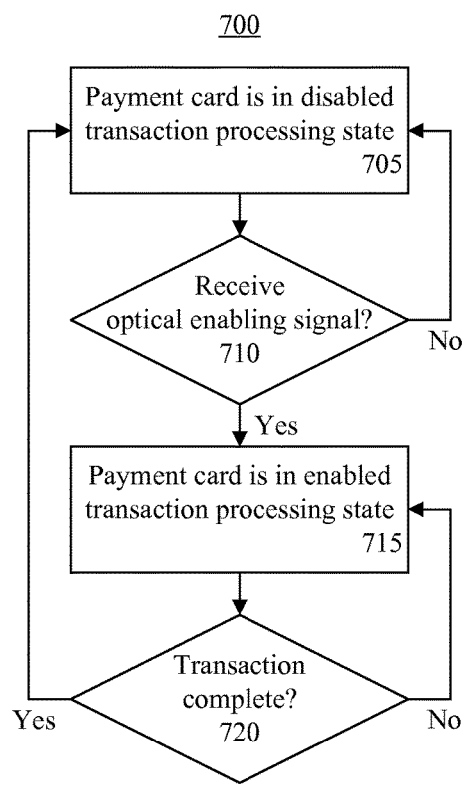
FIG. 7 is a flowchart illustrating an exemplary method of preventing fraudulent transactions using a payment card.

FIG. 7 is a flowchart illustrating an exemplary method 700 of preventing fraudulent transactions using a payment card. Method 700 may be implemented by a payment card using the exemplary architecture 600 of FIG. 6.

Method 700 begins in block 705, where the payment card is in the disabled transaction processing state. The processor, for example, maintains the disabled transaction processing state within the architecture of the payment card whether by ignoring received messages, not sending messages, disabling the RF transmitter and/or RF receiver, not performing transaction processing operations, or the like as described. The optical receiver of the payment card, however, remains active and is able to detect enabling optical signals while the remainder of the payment card is in the disabled transaction processing state.

In block 710, the payment card determines whether an enabling optical signal has been received. For example, the optical receiver, responsive to an optical signal, provides the signal to the processor for evaluation and/or decoding. The processor determines whether the received optical signal is an enabling optical signal as expected from a merchant system. For example, the processor compares one or more portions of the received optical signal with a stored representation of an enabling signal to determine whether the received optical signal is a match. If an enabling optical signal has not been received, method 700 loops back to block 705 where the payment card remains in the disabled transaction processing state. If an enabling optical signal is received, e.g., presence of a merchant system is detected via the optical signal, method 700 proceeds to block 715.

In block 715, the payment card is placed in the enabled transaction processing state. The processor, for example, may begin to respond to received messages and/or send messages. In another example, the processor may enable the RF transmitter and/or RF receiver if disabled. In still another example, the processor may perform transaction processing operations.

In block 720, the payment card determines whether the transaction is complete. If not, method 700 loops back to block 715 to continue processing the current transaction. It should be appreciated that once the payment card is enabled using the optical receiver to detect an enabling signal or merchant system presence, remaining or other operations relating for transaction processing as described herein or in accordance with other known methods and/or techniques are conducted using the RF receiver and/or RF transmitter (e.g., an RF transceiver). The RF transceiver may be an NFC transceiver. If the transaction is complete, method 700 loops back to block 705, where the payment card enters the disabled transaction processing state.

Figure 8:
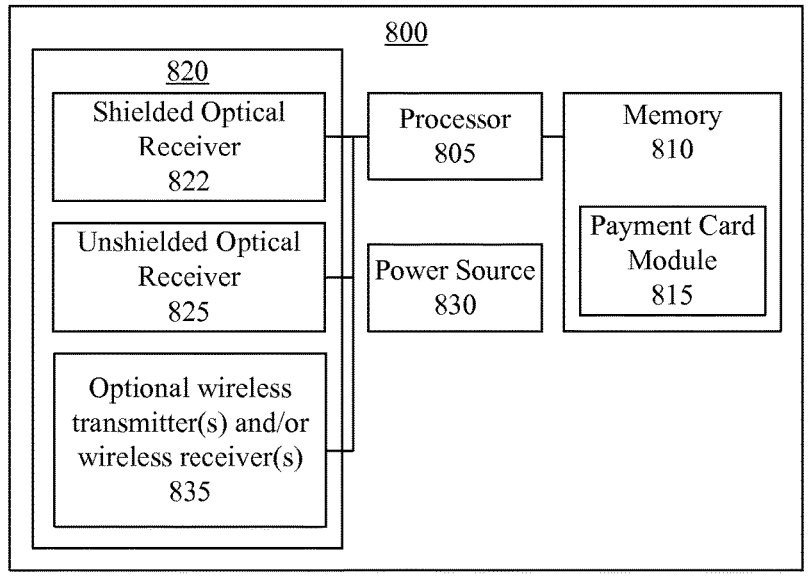
FIG. 8 is a block diagram illustrating another exemplary architecture for a payment card.

FIG. 8 is a block diagram illustrating another exemplary architecture 800 for a payment card. Architecture 800 may be used to implement payment card 105 as described with reference to FIG. 1. As pictured, architecture 800 includes a processor 805, memory 810 storing an executable payment card module 815, interface circuitry 820 including a shielded optical receiver 822, an unshielded optical receiver 825, one or more optional wireless transmitter(s) and/or wireless receiver(s) 835. Architecture 800 further includes a power source 830. Architecture 800 is substantially similar to architecture 300 of FIG. 3. Accordingly, processor 805, memory 810, payment card module 815, and power source 830 are not described in further detail. As noted, in embodiments where processor 805 does not execute program code, module 815 is not included or stored in memory 810.

Shielded optical receiver 822 and unshielded optical receiver 825 each may be implemented as an optical detector or an optical sensor. In one aspect, shielded optical receiver 822 and unshielded optical receiver 825 may be configured as visible light optical receivers. In another aspect, shielded optical receiver 822 and unshielded optical receiver 825 may be implemented as infrared optical receivers.

As used herein, the term "shielded optical receiver" means a receiver having a covering, or shield, which blocks visible light and/or infrared light over the portion of the sensor that is intended to detect an optical signal (e.g., the portion that is sensitive to light). When either visible or infrared light is directed at shielded optical receiver 822, shielded optical receiver 822 does not detect an optical signal. In one aspect, shielded optical receiver 822 is encased, or encompassed, within the material that forms the body portion of the payment card, e.g., a plastic or other suitable material. The term "unshielded optical receiver" means an optical receiver that is not shielded. An unshielded optical receiver, i.e., an "optical receiver," is one that has no covering that blocks or prevents visible light and/or infrared light from being detected by the portion of the optical receiver that detects optical signals.

It should be appreciated that the unshielded optical receiver may have one or more filters so that unwanted light frequencies are blocked, while desired light frequencies in the visible and/or infrared portions of the spectrum are not blocked and, as such, detected by unshielded optical receiver 825.

Architecture 800 also may include one or more optional wireless transmitter(s) and/or wireless receiver(s) 835. The additional wireless transmitters and/or receivers may be additional optical receivers, optical transmitters, RF receivers, and/or RF transmitters.

In the arrangement illustrated in FIG. 8, shielded optical receiver 822 is included to prevent attempted fraudulent transactions. In some cases, an attacker may generate an optical signal, e.g., a high energy light signal, having a frequency that is higher than the upper frequency threshold of the optical receiver within a payment card. When the optical signal is directed toward the payment card, the optical signal will still excite the optical receiver, resulting in the optical receiver detecting an optical signal. In cases where the frequency of the optical signal is sufficiently high, e.g., a high energy light signal such as soft X-Ray or one in the X-Ray range, the optical signal will not only penetrate personal accessories used to store the payment card, but also will penetrate shielding that blocks infrared and/or visible optical signals.

Architecture 800 may be used to thwart an attack using high frequency optical signals by inclusion of shielded optical receiver 822. In one aspect, for example, anytime that shielded optical receiver 822 is excited, i.e., detects an optical signal, such a condition may be interpreted as a malicious attack and an attempted fraudulent transaction. In that case, processor 805 may place architecture 800 in a disabled transaction processing state using any of the techniques described within this disclosure. Shielded optical receiver 822, however, may continue to operate so that discontinuation of the attack may be detected. When shielded optical receiver 822 no longer detects an optical signal, the attack is determined to have ended.

As previously discussed, a payment card using architecture 800 may include a magnetic strip. Further, a payment card using architecture 800 may include smart chip technology or other known elements commonly used for payment cards.

Figure 9:
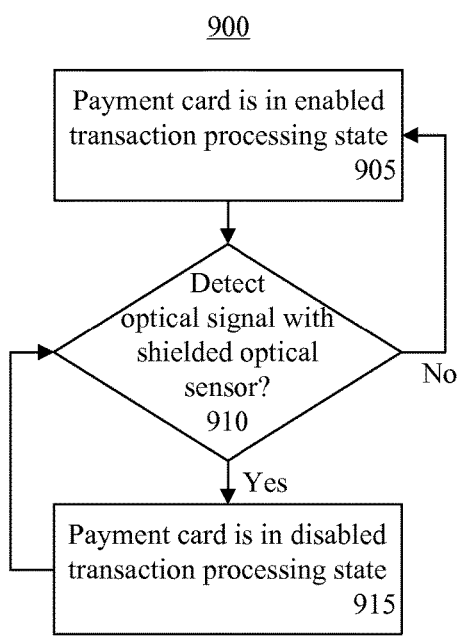
FIG. 9 is a flowchart illustrating another exemplary method of preventing fraudulent transactions using a payment card.

FIG. 9 is a flowchart illustrating another exemplary method 900 of preventing fraudulent transactions using a payment card. Method 900 may be implemented by a payment card using the exemplary architecture 800 of FIG. 8.

Method 900 begins in block 905, where the payment card is in an enabled transaction processing state. The processor, for example, maintains the enabled transaction processing state within the architecture of the payment card.

In block 910, the payment card determines whether the shielded optical receiver has detected an optical signal. If not, method 900 loops back to block 905 to continue processing. The payment card may remain in the enabled transaction processing state. If the shielded optical sensor does detect an optical signal, the payment card determines that an attempted fraudulent transaction is underway. Method 900 continues to block 915 where the processor of the payment card places the payment card in the disabled transaction processing state. Method 900 loops back to determine whether the shielded optical receiver continues to detect an optical signal and proceeds as shown.

It should be appreciated that while method 900 is shown in isolation, the technique illustrated in FIG. 9 may be used in conjunction with any other transaction processing technique described herein in which optical sensors are included. For example, method 900 may be incorporated into method 700 of FIG. 7. Method 900 may be performed anytime that the payment card is enabled, e.g., between blocks 715 and 720. Appreciably, in that case, the architecture of the payment card will include a shielded optical receiver. Method 900 further may be incorporated into method 500-1 and/or method 500-2. Similarly, method 700 may be included as a preliminary requirement to transaction processing in method 500-1 and/or method 500-2. Method 900 also may be applied to a purely optical payment card where only optical signals are exchanged between the merchant system and the payment card. In that case, the payment card may include an optical transmitter, an unshielded optical receiver, and the shielded optical receiver.

FIG. 10 is a block diagram illustrating another exemplary architecture 1000 for a payment card. Architecture 1000 may be used to implement payment card 105 as described with reference to FIG. 1. As pictured, architecture 1000 includes a processor 1005, memory 1010 storing an executable payment card module 1015, interface circuitry 1020 including a wireless transmitter 1022, a wireless receiver 1025, and an enable sensor 1035. As noted, in embodiments where processor 1005 does not execute program code, module 1015 is not included or stored in memory 1010. Architecture 1000 further includes a power source 1030. Architecture 1000 is substantially similar to architecture 1000 of FIG. 3. Accordingly, processor 1005, memory 1010, payment card module 1015, and power source 1030 are not described in further detail. Similarly, wireless transmitter 1022 may be an optical or an RF transmitter. Wireless receiver 1025 may be an optical or an RF receiver. Architecture 1000 may include additional wireless transmitter(s) and/or wireless receiver(s), including a shielded optical receiver.

As pictured, enable sensor 1035 is coupled to processor 1005. Enable sensor 1035 detects an enabling event, e.g., a user initiated enabling event, which is communicated to processor 1005 as an enabling signal. In one aspect, enable sensor 1035 is implemented as a touch sensor located on a surface of the payment card. A payment card using architecture 1000, for example, may be in the disabled transaction processing state unless processor 905 receives the enable signal from enable sensor 1035 indicating a detected touch. The particular location of the touch sensor can be selected to minimize interpretation of an unintentional touch as an enabling event.

In one example, the touch may be required to last a minimum amount of time to distinguish from an unintentional touch. Only a touch that is detected for the minimum amount of time is determined to be an enabling event. In another example, the touch may be required to have a minimum area. In that case, multiple touch sensors may be included forming enable sensor 1035 allowing architecture 1000 to determine the size, e.g., area, of a touch, and/or number of fingers forming the touch. Only those touches that have a minimum size are interpreted as enabling events. In still another example, a combination of time and size of touch may be used. In that case, only a touch detected for at least the minimum amount of time and having a minimum size is interpreted as an enabling event. In another example, enable sensor 1035 may be configured to detect a gesture such as a particular pattern of touch, e.g., swipes, swipes of a particular number of fingers, e.g., 1, 2, 3, or other touch movements across enable sensor 1035. As defined herein, a "gesture" refers to a detected pattern of motion on a touch sensor. The pattern of motion may be a result of one, two, or more fingers that are detected as part of the gesture. Responsive to a touch or gesture, processor 1005 places architecture 1000 in the enabled transaction processing state.

In another aspect, enable sensor 1035 may be implemented as an accelerometer. In one example, the enabling event may be the detection of a predetermined pattern of motion of architecture 1000 as interpreted by processor 1005 receiving motion data from the accelerometer.

In still another aspect, enable sensor 1035 may be implemented as a pressure sensor. One example of a pressure sensor is a piezo sensor. In illustration, the user of the payment card presses or applies pressure to enable sensor 1035. Enable sensor 1035 signals processor 1005 that at least a minimum amount of pressure is detected, i.e., the enabling event. The pressure detected by enable sensor 1035 further may need to be detected for at least a minimum amount of time to be interpreted as an enabling event. In another example, enable sensor 1035 may be used to detect a particular pattern of taps. The tapping pattern may also be detected when enable sensor 1035 is implemented as a touch sensor as opposed to a pressure sensor.

In yet another aspect, enable sensor 1035 may be implemented as a transducer that detects sound and/or converts sound waves to electrical signals. For example, enable sensor 1035 may be a microphone. In that case, microphone 1035 may detect user speech or voice. The enabling event, in that case, may be the detection of a particular voice, i.e., the voice of the user of the payment card, the detection of a particular user spoken utterance, or both the detection of a particular user spoken utterance and particular voice.

In still another aspect, enable sensor may be implemented as an imaging device, e.g., a camera or a fingerprint sensor. In the case of a fingerprint sensor, the enabling event may be the detection of the fingerprint of the user of the payment card. In the case of a camera, the enabling event may be the detection of a particular image.

Alternatively, the merchant system may capture an image of the user of the card and provide the captured image to the payment card. The enabling event may be the processor of the payment card determining, using image processing, e.g., facial recognition, that the image is of, or includes, the user of the payment card. Appreciably, the image processing described may be performed by any of the architectures described within this disclosure having a processor and the ability to communicate with the merchant system.

In any case, responsive to the enabling signal, processor 1005 places architecture 1000 in the enabled transaction processing state. In another example, the enabling event is a combination of the aforementioned detected events, i.e., touch, predetermined pattern of motion, pressure, concurrently with the detection of presence of a merchant system.

It should be appreciated that enable sensor 1035 may be utilized in embodiments where interface circuitry 1020 does not include a wireless transmitter and/or a wireless receiver. For example, enable sensor 1035 may be used in cases where processor 1005 communicates with a merchant system using surface contacts on the payment card. In that case, presence of the merchant system may be detected responsive to placing the payment card in a reader or in contact with a peripheral of the merchant system.

A payment card using architecture 1000 may include a magnetic strip storing information. Further, a payment card using architecture 1000 may include smart chip technology.

FIG. 11 is a flowchart illustrating another exemplary method 1100 of preventing fraudulent transactions using a payment card. Method 1100 may be implemented by a payment card using the exemplary architecture 1000 of FIG. 10.

Method 1100 begins in block 1105, where the payment card is in a disabled transaction processing state. The processor, for example, maintains the disabled transaction processing state within the architecture of the payment card.

In block 1110, the payment card determines whether an enabling event has been detected. In one aspect, the enabling event is the detection of a signal from the enable sensor. The enable signal indicates that a user touch has been detected, that a minimum amount of pressure has been detected, or that the payment card has been moved in a predetermined pattern. In another aspect, the enabling event is the concurrent detection of an enabling signal from the enable sensor and the detection of presence of a merchant system. Responsive to detecting the enabling event, method 1100 continues to block 1115. Responsive to determining that no enabling event is detected, method 1100 loops back to block 1105.

In block 1115, the payment card is in the enabled transaction processing state. In block 1120, the payment card determines whether a disabling event has been detected. A disabling event may be any of a variety of events including termination of the enabling signal, detecting no presence of a merchant system, timing out or other termination of a transaction, failure to start a transaction within a predetermined amount of time of the detected enabling event, or the like. If no disabling event is detected, method 1100 loops back to block 1115 to continue processing. If a disabling event is detected, method 1100 continues to block 1105, where the payment card is placed in the disabled transaction processing state.

Though method 1100 is described in isolation, it should be appreciated that method 1100 may be integrated into one or more other methods described within this specification such as method 500-1, method 500-2, method 700, method 900, etc.

Figure 12:
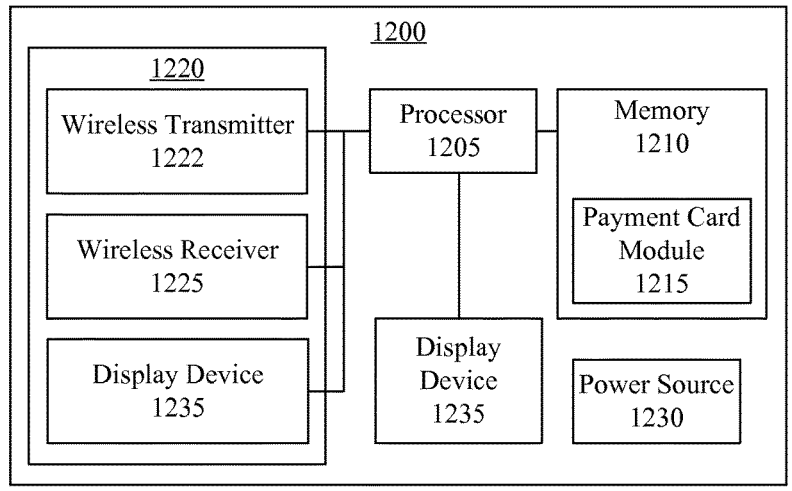
FIG. 12 is a block diagram illustrating another exemplary architecture for a payment card.

FIG. 12 is a block diagram illustrating another exemplary architecture 1200 for a payment card. Architecture 1200 may be used to implement payment card 105 as described with reference to FIG. 1. As pictured, architecture 1200 includes a processor 1205, memory 1210 storing an executable payment card module 1215, interface circuitry 1220 including a wireless transmitter 1222, a wireless receiver 1225, and an enable sensor 1235. Architecture 1200 further includes a power source 1230. Architecture 1200 is substantially similar to architecture 300 of FIG. 3. Accordingly, processor 1205, memory 1210, payment card module 1215, and power source 1230 are not described in further detail. Similarly, wireless transmitter 1222 may be an optical or an RF transmitter. Wireless receiver 1225 may be an optical or an RF receiver.

Architecture 1200 further includes a display device 1235. Display device 1235 is coupled to, and driven by, processor 1205. Display device 1235 may be implemented as a liquid crystal display (LCD), a flexible display device, or the like. In one aspect, when implemented as an LCD, display device 1235 may include a "reflective background" that does not have backlighting.

Display device 1235 may be used to display information to the user of the payment card using architecture 1200. For example, processor 1205 can display messages that may be received via wireless receiver 1225 from a merchant system, whether such messages originated from the merchant system or are passed through by the merchant system from the authorization system. In another aspect, processor 1205 may evaluate information received from a merchant system, the authorization system, or both and generate messages to the user, or owner, of the payment card.

In another aspect, processor 1205 may be programmed to generate codes upon display device 1235 that may be read by a merchant system. Examples of codes that may be generated and displayed upon display device 1235 include, but are not limited to, a bar code, a quick response (QR) code.

A payment card using architecture 1200 may include a magnetic strip storing information. Further, a payment card using architecture 1200 may include smart chip technology.

Figure 13:
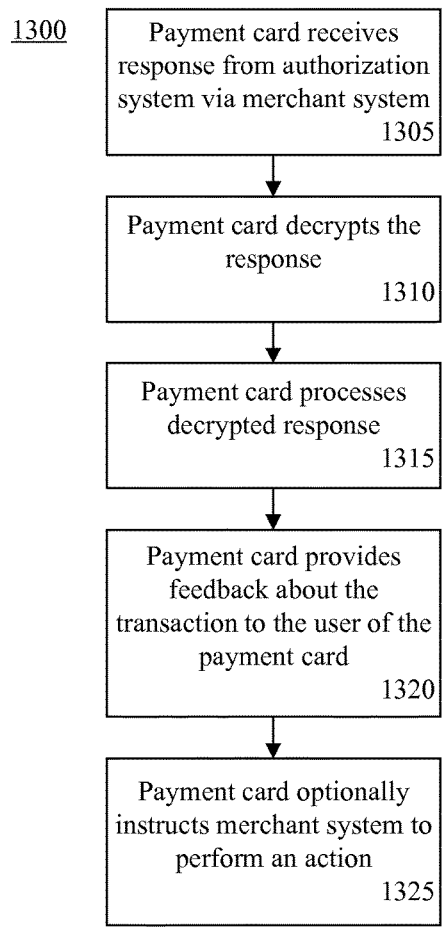
FIG. 13 is a flow chart illustrating another exemplary method of conducting a transaction.

FIG. 13 is a flow chart illustrating another exemplary method 1300 of conducting a transaction. Method 1300 may be performed by a payment card having any of the various architectures described within this disclosure. Method 1300 is performed during a transaction between a merchant system and the payment card.

Method 1300 provides a technique for dealing with a merchant system that may be untrusted or otherwise compromised. In most transactions, the merchant system is presumed to be safe from malicious attack. In some cases, however, the merchant system may have been compromised. For example, the merchant system may indicate that one amount is to be paid for a transaction, but request payment of a greater amount from the authorization system. The user of the payment card is unaware that the merchant system is requesting payment for an amount greater than may be displayed to the user by the merchant system.

Accordingly, method 1300 begins in a state where the payment card has started a transaction with a merchant system. For example, the payment card has received one or more data items relating to the transaction such as the total amount to be paid and optionally the certificate of the merchant system. As previously discussed, the merchant system acts as an intermediary between the payment card and the authorization system.

In block 1305, the payment card receives a response from the authorization system via the merchant system. As discussed, the authorization system may respond with approval and/or disapproval for the transaction as well as other information such as the amount that the merchant intends on charging to the payment card in payment for the transaction. The amount to be charged by the merchant system may be the amount originally provided to the payment card as part of the transaction information.

In another example, the merchant system optionally may request authorization for the transaction independently of any communications between the payment card and the authorization system. For instance, though the payment card may communicate with the authorization system to authenticate the merchant system using the merchant system certificate as previously described herein, the merchant system may request payment and/or authorization to charge the payment card independently of any communications between the payment card and the authorization system in which the merchant system acts as intermediary.

In block 1310, the payment card decrypts the response received from the authorization system through the merchant system acting as intermediary. In block 1315, the payment card processes the decrypted data. For example, the processor may identify the total amount to be charged to the payment card for the transaction, whether the merchant system was authenticated, determine whether the amount of the transaction from the merchant system matches the amount of the transaction from the authorization system as requested by the merchant system, etc.

In block 1320, the payment card provides the user, i.e., the holder or owner, of the payment card, with feedback relating to the transaction. The manner in which feedback is provided to the user depends upon whether the payment card includes a display device. If so, messages relating to the transaction may be displayed on the display device of the payment card directly. For example, the payment card can display the total amount that is to be charged for the transaction as provided the authorization system response. In another example, the payment card can display the amount requested to be charged by the merchant system and the amount that the authorization system approved. Other exemplary messages may indicate that the merchant certificate was or was not authenticated, is attempting to charge an incorrect amount, or the like.

In another aspect, the payment card may generate and send a further message to the merchant system whether over a short-range wireless communication channel or via physical contact in the event the payment card includes one or more surface contacts. The message, referred to as a "verification message" may specify or include content that only has meaning to the user of the payment card. The message may include instructions for the merchant system to play or otherwise render the verification message to the user.

In one aspect, the verification message may be one or more predefined textual messages that only have meaning to the user of the payment card. In another aspect, the verification message may include an image. In another aspect, the verification message may include audio. The verification message received from the payment card by the merchant system may be displayed to the user using a display device of the merchant system or otherwise played or provided, e.g., in the case of audio to the user using a peripheral device of the merchant system. Because the merchant system does not know the meaning or relevance of the verification message, the merchant system is unable to alter the message in a meaningful way to corrupt the meaning of the verification message being provided to the user.

For example, a verification message including a textual message sent by the payment card may be an alias for the amount that the merchant system has requested to charge. From a comparison of the textual message and the amount displayed by the merchant system, the user may easily determine whether the merchant system is attempting to collect an amount from the authorization system in payment for the transaction that is larger than displayed or otherwise indicated.

In illustration, the user may specify one or more textual or audio messages such as "have a nice day," "the weather is questionable," "enjoy your purchase," etc. Each message may be generated responsive to predetermined conditions. The payment card may send a verification message including content as noted above with an instruction for the merchant system to display or otherwise play the content of the verification message to the user using a peripheral device of the merchant system. Each verification message with particular content is sent by the payment card under particular circumstances.

As an example, the textual or audio message "have a nice day" may be sent from the payment card to the merchant system only in cases where the amount requested by the merchant system from the authorization system is less than a predetermined amount, e.g., $10.00. The textual or audio message "the weather is questionable" is sent by the payment card to the merchant system only in cases where the amount requested by the merchant system from the authorization system is greater than a predetermined amount, e.g., $500.00. In another example, the textual or audio message may be "birth year=x" where the value of x specified may be determined using a predetermined expression such as "(birthdate year)–(amount to be charged)". Verification message content may be generated by the payment card and are trusted by the user. Accordingly, the merchant system, if compromised, is unable to corrupt the messages that are provided to the user.

In another aspect, the payment card may store audio or phonemes of a particular person's voice, i.e., the voice of the user, the voice of the user's spouse, etc. In that case, if the payment card is equipped with a transducer that can output audio, the card may speak the amount requested by the merchant system from the authorization system. The audio and/or phonemes also may be provided from the payment card to the merchant system for playback to the user, e.g., with instructions to play the audio to the user over the speaker or transducer of the merchant system.

In block 1325, the payment card optionally instructs the merchant system to perform an action. For example, the payment card may send a message to the merchant system instructing the merchant system to turn on a camera and capture an image and/or video. The payment card may instruct the merchant system to activate a microphone and/or speaker. The payment card may instruct the merchant system to initiate a Voice over Internet Protocol (VoIP) call to a particular telephone number, address, or destination, e.g., to an agent of the authorization entity and open the microphone and/or activate a speaker so that the user may speak with the agent through the merchant system. In one aspect, the determination of whether the payment card instructs the merchant system to perform an action as described may be specified by the encrypted response received by the payment card from the authorization system using the merchant system as an intermediary.

In another example, where the payment card includes an accelerometer, the user of the payment card may instruct the merchant system to allow the payment card to send pointer commands to the merchant system. For example, a user of the payment card may utilize the payment card to control an onscreen pointer of the merchant system as a three dimensional (3D) mouse.

Figure 14:
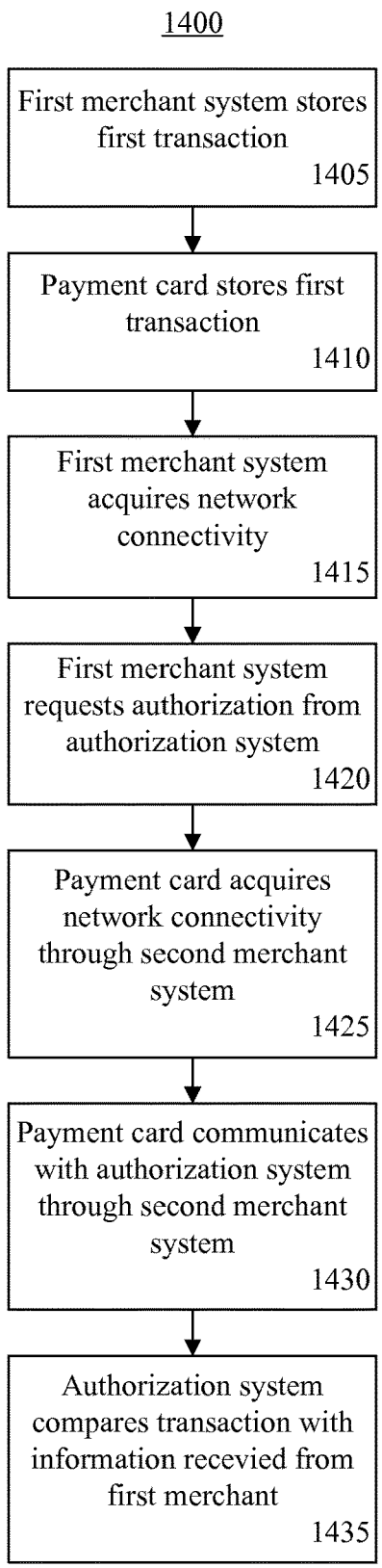
FIG. 14 is a flow chart illustrating another exemplary method of conducting a transaction.

FIG. 14 is a flow chart illustrating another exemplary method 1400 of conducting a transaction. Method 1400 may be performed by payment card 105 using any of the architectures described within this disclosure. Method 1400 illustrates an exemplary technique for handling offline transactions. More particularly, method 1400 may be used in cases where the merchant system does not have network access to communicate with network nodes such as an authorization system for taking payment using a payment card.

Accordingly, method 1400 begins in a state where a first transaction is attempted between a first merchant system and a payment card. The first merchant system and the payment card are able to communicate using the short-range wireless communication channel as described or through physical contact. The first merchant system, however, does not have network access, i.e., is "offline."

In block 1405, the first merchant system stores the first transaction. For example, the first merchant system stores the date, time, the total amount for the first transaction, identifying information for the user, account information for the payment card, etc. In another example, payment card may provide a transaction authentication number (TAN) to the merchant system that may be stored in lieu of more detailed account information. The first merchant system optionally encrypts the first transaction when stored.

In block 1410, the payment card also stores the first transaction locally as received from the first merchant system, e.g., the date, time, total amount, merchant system identifier, etc. In one aspect, the first transaction that is stored includes the merchant system certificate provided to the payment card. The payment card optionally encrypts the first transaction when stored.

In block 1415, at a later time, the first merchant system acquires network access, or connectivity. In block 1420, responsive to acquiring connectivity, the first merchant system requests authorization from the authorization system to charge the payment card for the first transaction.

In block 1425, the payment card acquires network connectivity at a time subsequent from the attempted transaction. The payment card may acquire network connectivity from a second and different merchant system. For example, during a second and different transaction with the second merchant system, the payment card may utilize the second merchant system as an intermediary for communicating with the authorization system to conclude the first transaction. In another example, the second merchant system may be a price checking system having network connectivity that also is configured to act as an intermediary as previously described. In either case, in block 1430, the payment card communicates the stored transaction to the authorization system through the second merchant system acting as an intermediary as previously described within this disclosure.

In block 1435, the authorization system compares the transaction with any information received from the first merchant system. The authorization payment card, for example, may indicate that a particular amount was charged on a particular date and/or time using a particular TAN. The authorization system may compare the transaction data provided from the payment card with the transaction information provided from the first merchant system and, responsive to determining a match, authorize the transaction.

The various payment card architectures described within this disclosure may include programming to operate with backwards compatibility. For example, depending upon the architecture, a payment card implemented as described herein may be programmed to perform or implement known or existing payment methods and/or techniques including known NFC or other transaction processing techniques.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated or shown. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A payment card includes interface circuitry and a processor coupled to the interface circuitry. The processor initiates operations using the interface circuitry as part of a transaction. The operations include receiving a certificate from a merchant system using the interface circuitry, encrypting the certificate, payment card identifying information, and a request for merchant system authentication forming encrypted authentication data, and sending, using the interface circuitry, the encrypted authentication data to the merchant system with an instruction to forward the encrypted authentication data to an authorization system for the payment card. The merchant system is unable to decrypt the encrypted authentication data. The operations also include receiving, using the interface circuitry, an encrypted response originating from the authorization system and forwarded to the payment card by the merchant system. The merchant system is unable to decrypt the encrypted response. The operations also include decrypting the encrypted response and determining whether the merchant system is authenticated according to the response.

The operations may include proceeding with the transaction responsive to determining that the merchant system is authenticated. The operations also may include sending to the merchant system an indication of whether the merchant system is authenticated. The operations further may include discontinuing the transaction responsive to determining the merchant system is not authenticated.

In one aspect, the interface circuitry includes a plurality of contacts.

In another aspect, the interface circuitry includes a wireless receiver and a wireless transmitter. For example, the wireless receiver may be an optical receiver. The wireless transmitter may be an optical transmitter.

In another example, the wireless receiver may be a radio frequency receiver. The wireless transmitter may be a radio frequency transmitter. In a further example, the radio frequency receiver is a near field receiver. The radio frequency transmitter may be a near field transmitter.

A method includes receiving, within a payment card, a certificate for a merchant system for a transaction, encrypting the certificate, payment card identifying information, and a request for merchant system authentication forming encrypted authentication data using a processor, sending the encrypted authentication data to the merchant system with an instruction to forward the encrypted authentication data to an authorization system for the payment card. The merchant system is unable to decrypt the encrypted authentication data. The method also includes receiving an encrypted response originating from the authorization system and forwarded to the payment card by the merchant system. The merchant system is unable to decrypt the encrypted response. The method further includes decrypting the encrypted response using the processor and determining whether the merchant system is authenticated according to the response.

The method may include proceeding with the transaction responsive to determining that the merchant system is authenticated. The method also may include sending to the merchant system an indication of whether the merchant system is authenticated. The method further may include discontinuing the transaction responsive to determining the merchant system is not authenticated.

In one aspect, the communications between the merchant system and the payment card are short-range, wireless communications. For example, the short-range wireless communications may include optical communications and/or radio frequency communications. The radio frequency communications may be near field communications.

A computer program product includes a computer readable storage medium having program code stored thereon. The program code is executable by a processor to perform a method. The method includes receiving, using the processor, a certificate for a merchant system for a transaction, encrypting the certificate, payment card identifying information, and a request for merchant system authentication forming encrypted authentication data using the processor, and sending, using the processor, the encrypted authentication data to the merchant system with an instruction to forward the encrypted authentication data to an authorization system for the payment card. The merchant system is unable to decrypt the encrypted authentication data. The method also includes receiving, using the processor, an encrypted response originating from the authorization system and forwarded to the payment card by the merchant system. The merchant system is unable to decrypt the encrypted response. The method further includes decrypting the encrypted response using the processor and determining, using the processor, whether the merchant system is authenticated according to the response.

The method may include proceeding with the transaction responsive to determining that the merchant system is authenticated. The method also may include sending to the merchant system an indication of whether the merchant system is authenticated. The method further may include discontinuing the transaction responsive to determining that the merchant system is not authenticated.

In one aspect, communications between the merchant system and the payment card are short-range, wireless communications. For example, the short-range wireless communications may include optical communications and/or radio frequency communications. The radio frequency communications may be near field communications.

A payment card includes interface circuitry having an optical receiver detecting an optical signal while the payment card is in a disabled transaction processing state. The payment card includes a processor coupled to the interface circuitry. The processor determines that the optical signal is from a merchant system. Responsive to determining that the optical signal is from the merchant system, an enabled transaction processing state is implemented within the payment card.

The interface circuit may include a radio-frequency transceiver that communicates with the merchant system to implement a transaction when in the enabled transaction processing state. The radio-frequency transceiver may be a near field communication transceiver.

In one example, the disabled processing state may be the processor not performing transaction processing operations. In another example, the disabled transaction processing state is the processor rendering the radio-frequency transceiver inoperable.

A method includes receiving an optical signal using an optical receiver within interface circuitry of a payment card while the payment card is in a disabled transaction processing state, determining, using a processor, that the optical signal is from a merchant system, and, responsive to determining that the optical signal is from the merchant system, implementing an enabled transaction processing state within the payment card.

The method may include performing transaction processing when in the enabled transaction processing state using a radio-frequency transceiver within the interface circuitry of the payment card. In one aspect, the radio-frequency transceiver is a near field communication transceiver.

In one example, the disabled transaction processing state may be the processor not performing transaction processing operations. In another example, the disabled transaction processing state may be the processor rendering the radio-frequency transceiver inoperable.

A computer program product includes a computer readable storage medium having program code stored thereon. The program code is executable by a processor to perform a method. The method includes receiving an optical signal using an optical receiver within interface circuitry of a payment card while the payment card is in a disabled transaction processing state, determining, using the processor, that the optical signal is from a merchant system, and, responsive to determining that the optical signal is from the merchant system, implementing an enabled transaction processing state within the payment card.

The method may include performing transaction processing when in the enabled transaction processing state using a radio-frequency transceiver within the interface circuitry of the payment card. The radio-frequency transceiver is a near field communication transceiver.

In one example, the disabled processing state may be the processor not performing transaction processing operations. In another example, the disabled transaction processing state may include the processor rendering the radio-frequency transceiver inoperable.

A payment card including a shielded optical receiver, an unshielded optical receiver, a wireless transmitter, and a processor coupled to the shielded optical receiver, the unshielded optical receiver, and the wireless transmitter. The processor initiates operations including detecting, using the shielded optical receiver, an optical signal and responsive to detecting the optical signal, disabling transaction processing within the payment card.

Disabling the transaction processing may include the processor not performing any transaction processing operations.

The processor may continue to disable transaction processing while an optical signal is detected by the shielded optical receiver.

A method of preventing fraudulent transactions using a payment card includes detecting, using a shielded optical receiver of the payment card, an optical signal and, responsive to detecting the optical signal, disabling transaction processing within the payment card using a processor.

Disabling transaction processing may include the processor not performing any transaction processing operations.

The processor may continue to disable transaction processing while an optical signal is detected by the shielded optical receiver.

A computer program product includes a computer readable storage medium having program code stored thereon. The program code is executable by a processor to perform a method. The method includes detecting, using a shielded optical receiver of the payment card under control of the processor, an optical signal and, responsive to detecting the optical signal, disabling transaction processing within the payment card using the processor.

Disabling transaction processing may include the processor not performing any transaction processing operations.

The processor may continue to disable transaction processing while an optical signal is detected by the shielded optical receiver.

A payment card includes interface circuitry having a sensor. The payment card also includes a processor coupled to the interface circuitry. The processor initiates operations including detecting, using the sensor, an enabling event for a transaction, detecting a presence of a merchant system, and, responsive to detecting the enabling event and the presence of the merchant system, implementing an enabled transaction processing state within the payment card.

The sensor may be a touch sensor. In that case, the enabling event may be a touch of a user on the payment card. The touch may be determined to be at least a minimum size. The touch may be a gesture. The touch may be detected for at least a minimum amount of time.

The sensor may be a pressure sensor. In that case, the enabling event may be a minimum amount of pressure.

The sensor may be an accelerometer. Accordingly, the enabling event may be a predetermined pattern of motion of the payment card.

The sensor may be a transducer. As such, the enabling event may be detection of a voice of a user of the payment card, detection of a predetermined user spoken utterance, and/or detection of a voice of a user of the payment card speaking a predetermined user spoken utterance.

A method of preventing fraudulent transactions using a payment card includes detecting, using a sensor and a processor of the payment card, an enabling event for a transaction, detecting a presence of a merchant system, and, responsive to detecting the enabling event and the presence of the merchant system, implementing an enabled transaction processing state within the payment card using the processor.

The sensor may be a touch sensor. In that case, the enabling event may be a touch of a user on the payment card. The touch may be at least a minimum size. The touch may be a gesture. The touch may be detected for at least a minimum amount of time.

The sensor may be a pressure sensor. In that case, the enabling event may be a minimum amount of pressure.

The sensor may be an accelerometer. Accordingly, the enabling event may be a predetermined pattern of motion of the payment card.

The sensor may be a transducer. As such, the enabling event may be detection of a voice of a user of the payment card, detection of a predetermined user spoken utterance, and/or detection of a voice of a user of the payment card speaking a predetermined user spoken utterance.

A computer program product includes a computer readable storage medium having program code stored thereon. The program code is executable by a processor to perform a method. The method includes detecting, using a sensor of the payment card and the processor, an enabling event for a transaction, detecting a presence of a merchant system using the processor, and, responsive to detecting the enabling event and the presence of the merchant system, implementing an enabled transaction processing state within the payment card using the processor.

The sensor may be a touch sensor. In that case, the enabling event may be a touch of a user on the payment card. The touch may be determined to be at least a minimum size. The touch may be a gesture. The touch may be detected for at least a minimum amount of time.

The sensor may be a pressure sensor. In that case, the enabling event is a minimum amount of pressure.

The sensor may be an accelerometer. Accordingly, the enabling event may be a predetermined pattern of motion of the payment card.

The sensor may be a transducer. As such, the enabling event may be detection of a voice of a user of the payment card, detection of a predetermined user spoken utterance, and/or detection of a voice of a user of the payment card speaking a predetermined user spoken utterance.

A payment card includes interface circuitry and a processor coupled to the interface circuitry. The processor initiates operations using the interface circuitry as part of a transaction. The operations include receiving a first message originating from an authorization system and forwarded to the payment card by the merchant system, processing the first message, and sending a second message to the merchant system. The second message includes an instruction determined according to the processing of the first message. The instruction is executed by the merchant system and causes the merchant system to perform an action specified by the instruction.

The first message may be at least partially encrypted and processing the first message may include decrypting the first message. The merchant system is unable to decrypt the first message.

The action of the second message may be determined from the first message.

The second message may be a verification message including content and the instruction. The action may include the merchant system rendering the content. The content may be a textual message, an audio message, and/or an image.

The instruction may activate at least one of a microphone, a camera, a display, and a speaker of the merchant system.

A method of transaction processing using a payment card includes receiving, using a processor of the payment card, a first message originating from an authorization system and forwarded to the payment card by the merchant system, processing the first message using the processor, and sending a second message to the merchant system, wherein the second message includes an instruction determined according to the processing of the first message. The instruction is executed by the merchant system and causes the merchant system to perform an action specified by the instruction.

The first message may be at least partially encrypted. Processing the first message may include decrypting the first message. The merchant system is unable to decrypt the first message.

The action of the second message may be determined from the first message.

The second message may be a verification message including content and the instruction. The action may be the merchant system rendering the content. The content may be a textual message, an audio message, and/or an image.

The instruction may activate at least one of a microphone, a camera, a display, and a speaker of the merchant system.

A computer program product includes a computer readable storage medium having program code stored thereon. The program code is executable by a processor to perform a method. The method includes receiving, using the processor, a first message originating from an authorization system and forwarded to a payment card by the merchant system, processing the first message using the processor, and sending a second message to the merchant system using the processor. The second message includes an instruction determined according to the processing of the first message. The instruction, when executed by the merchant system, causes the merchant system to perform an action.

The first message may be at least partially encrypted. Processing the first message may include decrypting the first message. The merchant system is unable to decrypt the first message.

The action of the second message may be determined from the first message.

The second message may be a verification message including content and the instruction. The action includes the merchant system rendering the content. The content may be a textual message, an audio message, and/or an image.

The instruction may activate at least one of a microphone, a camera, a display, and a speaker of the merchant system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A payment card, comprising:
   interface circuitry; and
   a processor coupled to the interface circuitry, wherein the processor initiates operations using the interface circuitry as part of a transaction, wherein the operations comprise:
   receiving a certificate from a merchant system using the interface circuitry;
   encrypting the certificate, payment card identifying information, and a request for merchant system authentication forming encrypted authentication data;
   sending, using the interface circuitry, the encrypted authentication data to the merchant system with an instruction executable by the merchant system that includes a network address for an authorization system configured to authenticate the merchant system to the payment card, wherein the merchant system is unable to decrypt the encrypted authentication data;
   wherein the merchant system, in response to executing the instruction, sends the encrypted authentication data to the network address enumerated in the instruction;
   receiving, using the interface circuitry, an encrypted response originating from the authorization system with the network address and forwarded to the payment card by the merchant system, wherein the merchant system is unable to decrypt the encrypted response;

decrypting the encrypted response;

determining whether the merchant system is authenticated according to the response and proceeding with the transaction only in response to determining that the merchant system is authenticated; and in response to authentication of the merchant system and receiving an amount of the transaction, sending a further instruction, executable by the merchant system, from the payment card to the merchant system directing the merchant system to perform an action specified by the further instruction, wherein the merchant system, in response to executing the further instruction, performs the action;

wherein the further instruction includes content, the action is rendering the content included in the further instruction, and the merchant system performs the action by rendering the content on a device of the merchant system; and wherein the payment card selects the content included in the further instruction from a plurality of content items or generates the content based upon an attribute of the transaction.

2. The payment card of claim 1, wherein the instruction further directs the merchant system to forward the encrypted response from the authorization system to the payment card.

3. The payment card of claim 1, wherein the operations further comprise:

sending to the merchant system an indication of whether the merchant system is authenticated.

4. The payment card of claim 1, wherein the operations further comprise:

discontinuing the transaction responsive to determining the merchant system is not authenticated.

5. The payment card of claim 1, wherein the interface circuitry comprises a plurality of contacts.

6. The payment card of claim 1, wherein the interface circuitry comprises:

a wireless receiver; and
a wireless transmitter.

7. The payment card of claim 6, wherein:

the wireless receiver is an optical receiver; and
the wireless transmitter is an optical transmitter.

8. The payment card of claim 6, wherein:

the wireless receiver is a radio frequency receiver; and
the wireless transmitter is a radio frequency transmitter.

9. The payment card of claim 8, wherein:

the radio frequency receiver is a near field receiver; and
the radio frequency transmitter is a near field transmitter.

10. The payment card of claim 1, wherein the instruction further specifies a communication channel selected from a plurality of communication channels, wherein the merchant system sends the encrypted authentication data to the network address using the communication channel specified in the instruction.

11. The payment card of claim 1, wherein the attribute of the transaction is the amount of the transaction.

12. The payment card of claim 1, wherein the action includes activating the device of the merchant system.

13. A method, comprising:

receiving, within a payment card, a certificate for a merchant system for a transaction;

encrypting the certificate, payment card identifying information, and a request for merchant system authentication forming encrypted authentication data using a processor;

sending the encrypted authentication data to the merchant system with an instruction executable by the merchant system that includes a network address for an authorization system configured to authenticate the merchant system to the payment card, wherein the merchant system is unable to decrypt the encrypted authentication data;

wherein the merchant system, in response to executing the instruction, sends the encrypted authentication data to the network address enumerated in the instruction;

receiving an encrypted response originating from the authorization system with the network address and forwarded to the payment card by the merchant system, wherein the merchant system is unable to decrypt the encrypted response;

decrypting the encrypted response using the processor;

determining whether the merchant system is authenticated according to the response and proceeding with the transaction only in response to determining that the merchant system is authenticated; and in response to authentication of the merchant system and receiving an amount of the transaction, sending a further instruction, executable by the merchant system, from the payment card to the merchant system directing the merchant system to perform an action specified by the further instruction, wherein the merchant system, in response to executing the further instruction, performs the action;

wherein the further instruction includes content, the action is rendering the content included in the further instruction, and the merchant system performs the action by rendering the content on a device of the merchant system; and wherein the payment card selects the content included in the further instruction from a plurality of content items or generates the content based upon an attribute of the transaction.

14. The method of claim 13, wherein the instruction further directs the merchant system to forward the encrypted response from the authorization system to the payment card.

15. The method of claim 13, further comprising:

sending to the merchant system an indication of whether the merchant system is authenticated.

16. The method of claim 13, further comprising:

discontinuing the transaction responsive to determining the merchant system is not authenticated.

17. The method of claim 13, wherein the payment card and the merchant system communicate through at least one contact on a surface of the payment card.

18. The method of claim 13, wherein the merchant system and the payment card communicate using short-range, wireless communications.

19. The method of claim 18, wherein the short-range wireless communications comprise optical communications.

20. The method of claim 18, wherein the short-range wireless communications comprise radio frequency communications.

21. The method of claim 20, wherein the short-range wireless communications comprises near field communications.

22. The method of claim 13, wherein the instruction further specifies a communication channel selected from a plurality of communication channels, wherein the merchant system sends the encrypted authentication data to the network address using the communication channel specified in the instruction.

23. The method of claim 13, wherein the attribute of the transaction is the amount of the transaction.

24. The method of claim 13, wherein the action includes activating the device of the merchant system.

25. A computer program product comprising a computer readable storage medium having program code stored thereon, the program code executable by a processor to perform a method comprising:
   receiving, using the processor, a certificate for a merchant system for a transaction;
   encrypting the certificate, payment card identifying information, and a request for merchant system authentication forming encrypted authentication data using the processor;
   sending, using the processor, the encrypted authentication data to the merchant system with an instruction executable by the merchant system that includes a network address for an authorization system configured to authenticate the merchant system to the payment card, wherein the merchant system is unable to decrypt the encrypted authentication data;
   wherein the merchant system, in response to executing the instruction, sends the encrypted authentication data to the network address enumerated in the instruction;
   receiving, using the processor, an encrypted response originating from the authorization system with the network address and forwarded to the payment card by the merchant system, wherein the merchant system is unable to decrypt the encrypted response;
   decrypting the encrypted response using the processor;
   determining, using the processor, whether the merchant system is authenticated according to the response and proceeding with the transaction only in response to determining that the merchant system is authenticated; and
   in response to authentication of the merchant system and receiving an amount of the transaction, sending a further instruction, executable by the merchant system, from the payment card to the merchant system directing the merchant system to perform an action specified by the further instruction, wherein the merchant system, in response to executing the further instruction, performs the action;
   wherein the further instruction includes content, the action is rendering content included in the further instruction, and the merchant system performs the action by rendering the content on a device of the merchant system; and
   wherein the payment card selects the content included in the further instruction from a plurality of content items or generates the content based upon an attribute of the transaction.

26. The computer program product of claim 25, wherein the instruction further directs the merchant system to forward the encrypted response from the authorization system to the payment card.

27. The computer program product of claim 25, further comprising:
   sending to the merchant system an indication of whether the merchant system is authenticated.

28. The computer program product of claim 25, further comprising:
   discontinuing the transaction responsive to determining that the merchant system is not authenticated.

29. The computer program product of claim 25, wherein the payment card and the merchant system communicate through at least one contact on a surface of the payment card.

30. The computer program product of claim 25, wherein the merchant system and the payment card communicate using short-range, wireless communications.

31. The computer program product of claim 30, wherein the short-range wireless communications comprise optical communications.

32. The computer program product of claim 30, wherein the short-range wireless communications comprise radio frequency communications.

33. The computer program product of claim 32, wherein the short-range wireless communications comprises near field communications.

34. The computer program product of claim 25, wherein the instruction further specifies a communication channel selected from a plurality of communication channels, wherein the merchant system sends the encrypted authentication data to the network address using the communication channel specified in the instruction.

35. The computer program of claim 25, wherein the attribute of the transaction is the amount of the transaction.

36. The computer program of claim 25, wherein the action includes activating the device of the merchant system.

37. A payment card, comprising:
   interface circuitry; and
   a processor coupled to the interface circuitry, wherein the processor initiates operations using the interface circuitry as part of a transaction, wherein the operations comprise:
      receiving a certificate from a merchant system using the interface circuitry;
      encrypting the certificate, payment card identifying information, and a request for merchant system authentication forming encrypted authentication data;
      sending, using the interface circuitry, the encrypted authentication data to the merchant system with an instruction executable by the merchant system that includes a network address for an authorization system configured to authenticate the merchant system to the payment card, wherein the merchant system is unable to decrypt the encrypted authentication data;
      wherein the merchant system, in response to executing the instruction, sends the encrypted authentication data to the network address enumerated in the instruction;
      receiving, using the interface circuitry, an encrypted response originating from the authorization system with the network address and forwarded to the payment card by the merchant system, wherein the merchant system is unable to decrypt the encrypted response;
      decrypting the encrypted response;
      determining whether the merchant system is authenticated according to the response and proceeding with the transaction only in response to determining that the merchant system is authenticated;
      comparing a transaction amount received from the merchant system with a transaction amount received from the authorization system as requested by the merchant system; and providing a verification message indicating whether the transaction amount received from the merchant system matches the transaction amount received from the authorization system.

38. The payment card of claim 37, wherein the instruction further directs the merchant system to forward the encrypted response from the authorization system to the payment card.

39. The payment card of claim 37, wherein the operations further comprise:
sending to the merchant system an indication of whether the merchant system is authenticated.

40. The payment card of claim 37, wherein the operations further comprise:
discontinuing the transaction responsive to determining the merchant system is not authenticated.

41. The payment card of claim 37, wherein the interface circuitry comprises a plurality of contacts.

42. The payment card of claim 37, wherein the interface circuitry comprises:
a wireless receiver; and
a wireless transmitter.

43. The payment card of claim 42, wherein:
the wireless receiver is an optical receiver; and
the wireless transmitter is an optical transmitter.

44. The payment card of claim 42, wherein:
the wireless receiver is a radio frequency receiver; and
the wireless transmitter is a radio frequency transmitter.

45. The payment card of claim 44, wherein:
the radio frequency receiver is a near field receiver; and
the radio frequency transmitter is a near field transmitter.

46. The payment card of claim 37, wherein the instruction further specifies a communication channel selected from a plurality of communication channels, wherein the merchant system sends the encrypted authentication data to the network address using the communication channel specified in the instruction.

47. A method, comprising:
receiving, within a payment card, a certificate for a merchant system for a transaction;
encrypting the certificate, payment card identifying information, and a request for merchant system authentication forming encrypted authentication data using a processor;
sending the encrypted authentication data to the merchant system with an instruction executable by the merchant system that includes a network address for an authorization system configured to authenticate the merchant system to the payment card, wherein the merchant system is unable to decrypt the encrypted authentication data;
wherein the merchant system, in response to executing the instruction, sends the encrypted authentication data to the network address enumerated in the instruction;
receiving an encrypted response originating from the authorization system with the network address and forwarded to the payment card by the merchant system, wherein the merchant system is unable to decrypt the encrypted response;
decrypting the encrypted response using the processor;
determining whether the merchant system is authenticated according to the response and proceeding with the transaction only in response to determining that the merchant system is authenticated;
comparing a transaction amount received from the merchant system with a transaction amount received from the authorization system as requested by the merchant system; and providing a verification message indicating whether the transaction amount received from the merchant system matches the transaction amount received from the authorization system.

48. The method of claim 47, wherein the instruction further directs the merchant system to forward the encrypted response from the authorization system to the payment card.

49. The method of claim 47, further comprising:
sending to the merchant system an indication of whether the merchant system is authenticated.

50. The method of claim 47, further comprising:
discontinuing the transaction responsive to determining the merchant system is not authenticated.

51. The method of claim 47, wherein the payment card and the merchant system communicate through at least one contact on a surface of the payment card.

52. The method of claim 47, wherein the merchant system and the payment card communicate using short-range, wireless communications.

53. The method of claim 52, wherein the short-range wireless communications comprise optical communications.

54. The method of claim 52, wherein the short-range wireless communications comprise radio frequency communications.

55. The method of claim 54, wherein the short-range wireless communications comprises near field communications.

56. The method of claim 47, wherein the instruction further specifies a communication channel selected from a plurality of communication channels, wherein the merchant system sends the encrypted authentication data to the network address using the communication channel specified in the instruction.

57. A computer program product comprising a computer readable storage medium having program code stored thereon, the program code executable by a processor to perform a method comprising:
receiving, using the processor, a certificate for a merchant system for a transaction;
encrypting the certificate, payment card identifying information, and a request for merchant system authentication forming encrypted authentication data using the processor;
sending, using the processor, the encrypted authentication data to the merchant system with an instruction executable by the merchant system that includes a network address for an authorization system configured to authenticate the merchant system to the payment card, wherein the merchant system is unable to decrypt the encrypted authentication data;
wherein the merchant system, in response to executing the instruction, sends the encrypted authentication data to the network address enumerated in the instruction;
receiving, using the processor, an encrypted response originating from the authorization system with the network address and forwarded to the payment card by the merchant system, wherein the merchant system is unable to decrypt the encrypted response;
decrypting the encrypted response using the processor;
determining, using the processor, whether the merchant system is authenticated according to the response and proceeding with the transaction only in response to determining that the merchant system is authenticated;
comparing a transaction amount received from the merchant system with a transaction amount received from the authorization system as requested by the merchant system; and providing a verification message indicating whether the transaction amount received from the merchant system matches the transaction amount received from the authorization system.

58. The computer program product of claim 57, wherein the instruction further directs the merchant system to forward the encrypted response from the authorization system to the payment card.

59. The computer program product of claim 57, further comprising:
sending to the merchant system an indication of whether the merchant system is authenticated.

60. The computer program product of claim 57, further comprising:
discontinuing the transaction responsive to determining that the merchant system is not authenticated.

61. The computer program product of claim 57, wherein the payment card and the merchant system communicate through at least one contact on a surface of the payment card.

62. The computer program product of claim 57, wherein the merchant system and the payment card communicate using short-range, wireless communications.

63. The computer program product of claim 62, wherein the short-range wireless communications comprise optical communications.

64. The computer program product of claim 62, wherein the short-range wireless communications comprise radio frequency communications.

65. The computer program product of claim 64 wherein the short-range wireless communications comprises near field communications.

66. The payment card of claim 57, wherein the instruction further specifies a communication channel selected from a plurality of communication channels, wherein the merchant system sends the encrypted authentication data to the network address using the communication channel specified in the instruction.

* * * * *